US009927802B2

(12) United States Patent
Nagai

(10) Patent No.: US 9,927,802 B2
(45) Date of Patent: Mar. 27, 2018

(54) CUTTING DATA GENERATOR, CUTTING APPARATUS AND NON-TRANSITORY COMPUTER-READABLE MEDIUM

(71) Applicant: BROTHER KOGYO KABUSHIKI KAISHA, Nagoya-shi, Aichi (JP)

(72) Inventor: Masahiko Nagai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 569 days.

(21) Appl. No.: 14/521,003

(22) Filed: Oct. 22, 2014

(65) Prior Publication Data

US 2015/0120030 A1    Apr. 30, 2015

(30) Foreign Application Priority Data

Oct. 25, 2013  (JP) ................................. 2013-222200

(51) Int. Cl.
| | |
|---|---|
| G06F 19/00 | (2011.01) |
| G05B 19/4097 | (2006.01) |
| B26D 5/00 | (2006.01) |
| G06T 11/60 | (2006.01) |

(52) U.S. Cl.
CPC ........... *G05B 19/4097* (2013.01); *B26D 5/00* (2013.01); *B26D 5/007* (2013.01); *G06T 11/60* (2013.01); *G05B 2219/35219* (2013.01)

(58) Field of Classification Search
CPC ...... G05B 19/4097; G05B 2219/35219; B26D 5/007; B26D 5/00; G06T 17/00

USPC ........................................................... 700/97
See application file for complete search history.

(56) References Cited

U.S. PATENT DOCUMENTS

| | | | |
|---|---|---|---|
| 2005/0186010 A1 | 8/2005 | Shibata et al. | |
| 2011/0310423 A1* | 12/2011 | Motosugi ........... | H04N 1/00355 358/1.13 |
| 2012/0247293 A1* | 10/2012 | Nagai ................... | B26F 1/3806 83/76.3 |
| 2014/0182432 A1* | 7/2014 | Muto .................... | B26D 5/005 83/76.7 |

FOREIGN PATENT DOCUMENTS

| | | |
|---|---|---|
| JP | H06-21991 U | 3/1994 |
| JP | 2000-280199 A | 10/2000 |
| JP | 2005-246562 A | 9/2005 |
| JP | 2012-213846 A | 11/2012 |

\* cited by examiner

*Primary Examiner* — Ziaul Karim
(74) *Attorney, Agent, or Firm* — K&L Gates LLP

(57) ABSTRACT

A cutting data generator includes an editing unit configured to edit a plurality of figures into a desirable pattern and a control device. The control device is configured to detect superposition of outlines of the figures adjacent to each other and/or an intersection of the outlines of the adjacent figures and to generate cutting data including a first cut line which is an outline of the pattern and a second cut line which is the detected superposed outline and/or a line segment between the intersections, the first cut line being a line along which the pattern is cut out of a sheet, the second cut line being a groove-shaped or perforated line.

10 Claims, 16 Drawing Sheets

| | MODE | BLADE PROJECTION AMOUNT | CUTTER PRESSURE |
|---|---|---|---|
| KENT PAPER | FULL CUT | 4.0 | 4.0 |
| | HALF CUT | 2.5 | 0.0 |
| HEAVY PAPER | FULL CUT | 6.0 | 4.0 |
| | HALF CUT | 4.5 | 3.0 |

| | FEED DATA (Fx0,Fy0) |
|---|---|
| CUTTING DATA | FIRST COORDINATE DATA (x1,y1) |
| | SECOND COORINATE DATA (x2,y2) |
| | THIRD COORDINATE DATA (x3,y3) |
| | FOURTH COORDINATE DATA (x4,y4) |
| | END CODE |

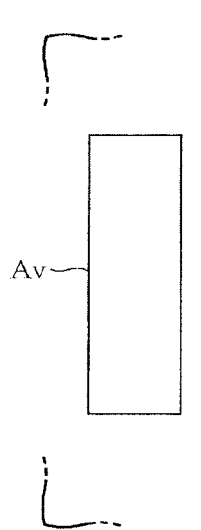
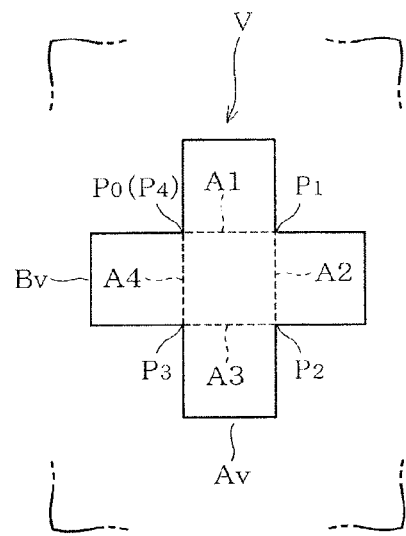
FIG.18A            FIG.18B
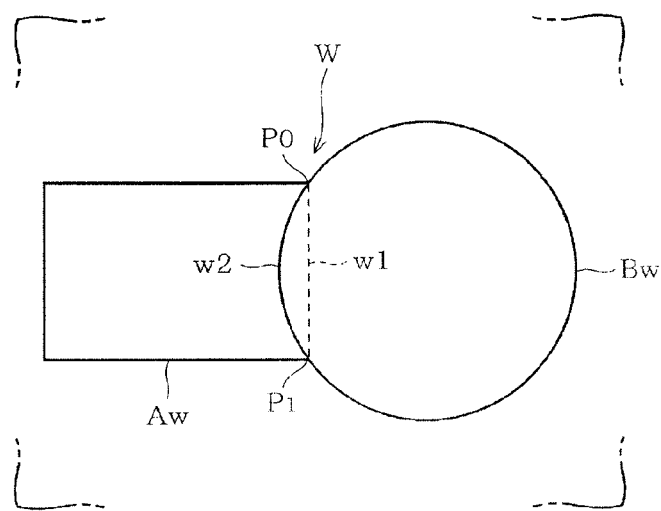
FIG.19

CUTTING DATA GENERATOR, CUTTING APPARATUS AND NON-TRANSITORY COMPUTER-READABLE MEDIUM

CROSS-REFERENCE TO RELATED APPLICATIONS

This application is based upon and claims the benefit of priority from the prior Japanese Patent Application No. 2013-222200 filed on Oct. 25, 2013, the entire contents of which are incorporated herein by reference.

BACKGROUND

1. Technical Field

The present disclosure relates to a cutting data generator generating cutting data, a cutting apparatus and a non-transitory computer-readable medium.

2. Related Art

A cutting platter is conventionally known which automatically cuts a pattern, out of a sheet such as paper. The sheet is attached to a holding member having an adhesive layer on a surface thereof. Both ends of the holding member are vertically held between a driving roller and a pinch roller to be moved in a first direction, and a carriage having a cutting blade is moved in a second direction, perpendicular to the first direction so that the sheet is cut by the cutting blade.

On the other hand, a label manufacturing machine is known which manufactures labels. A tack sheet wound on a cylindrical roil core is used as the sheet with the label manufacturing machine. The tack sheet is made by sticking release paper to an adhesive sheet. The label manufacturing machine includes a Conveying roller drawing and conveying the tack sheet from, the roll core and a cutting blade for cutting the conveyed tack sheet. The label manufacturing machine is capable of cutting the tack sheet in two modes of a half out mode in which only the adhesive sheet is cut and a full cut mode in which both adhesive sheet and release sheet are cut. In this case, a user edits cutting data of a pattern and designates a half cut line or a full cut line as line segments of a figure composing the pattern. As a result, the edited pattern, is cut in a desirable cutting modes to toe formed into a label.

SUMMARY

The above-described label manufacturing machine is provided with a carriage moving the cutting blade in a direction perpendicular to a conveying direction of the tack sheet. The carriage of the label manufacturing machine has a construction common to the cutting plotter. Accordingly, execution of half cut or full cut has been considered for the sheet on a holding member.

However, in order that the half or full cut may be designated during edit of the cutting data, cutting data of the pattern to be edited needs to be read one by one so that appropriate data is confirmed and so that, line segments are designated. This results in a troublesome complicated work. Further, differing from the label manufacturing machine, the cutting plotter can use various types of sheets. For example, patterns are cut for various purposes, for example, to make a cubic object with half cut lines serving as fold lines of a developed figure of the pattern. Accordingly, a complicated pattern requires much time for edit of cutting data.

Therefore, an object of the disclosure is to provide a cutting data generator, a cutting apparatus and a non-transitory computer-readable medium which can generate cutting data on which a full cut line and a half cut line can be formed.

The disclosure provides a cutting data generator comprising an editing unit configured to edit a plurality of figures into a desirable pattern and a control devise configured to detect superposition of outlines of the figures adjacent to each other and/or an intersection of the outlines of the adjacent figures and to generate cutting data including a first cut line which is an outline of the pattern and a second cot line which is the detected superposed outline and/or a line segment between the intersections, the first cut line being a line along which the pattern is cut out of a sheet, the second cot line being a groove-shaped or perforated line.

The disclosure also provides a cutting apparatus which cots a desirable pattern out of a sheet, comprising a moving unit, configured to move a sheet and a cutting unit relative to each other, an editing unit configured to edit a plurality of figures into a desirable pattern and a control device configured to detect superposition of outlines of the figures adjacent to each other and/or an intersection of the outlines of the adjacent figures, to generate cutting data including a first cut line which is an outline of the pattern and a second cut line which is the detected superposed outline and/or a line segment between the intersections, the first cut line being a line along which the pattern is cut out of a sheet, the second cut line being a groove-shaped or perforated line and to control the moving unit so that the first and second out lines are formed on the sheet, based on the cutting data.

The disclosure further provides a non-transitory computer-readable medium storing a program for a cutting data generator comprising an editing unit configured to edit a plurality of figures into a desirable pattern and a control device. The program causes the control device to execute instructions which, when executed, cause the generator to detect superposition of outlines of the figures adjacent to each other and/or an intersection of the outlines of the adjacent figures and to generate cutting data including a first cut line which is an outline of the pattern and a second cut line which is the detected superposed outline and/or a line segment between the intersections, the first cut line being a line along which the pattern is cut out of a sheet, the second cut line being a groove-shaped or perforated line.

BRIEF DESCRIPTION OR THE DRAWINGS

Figures 8, 9A, 9B:
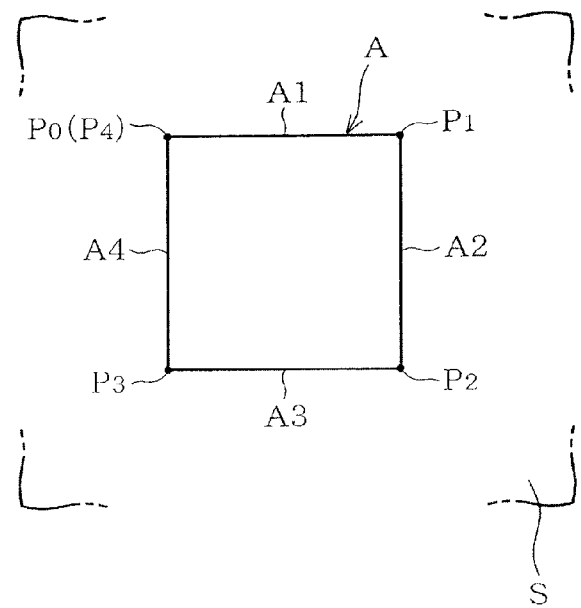
Figure 10:
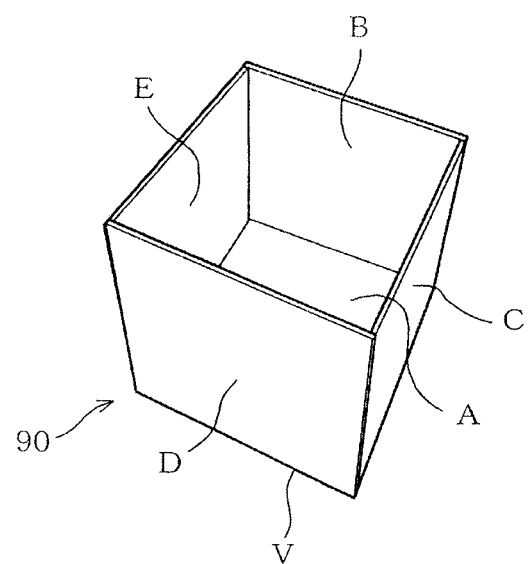
Figure 11A:
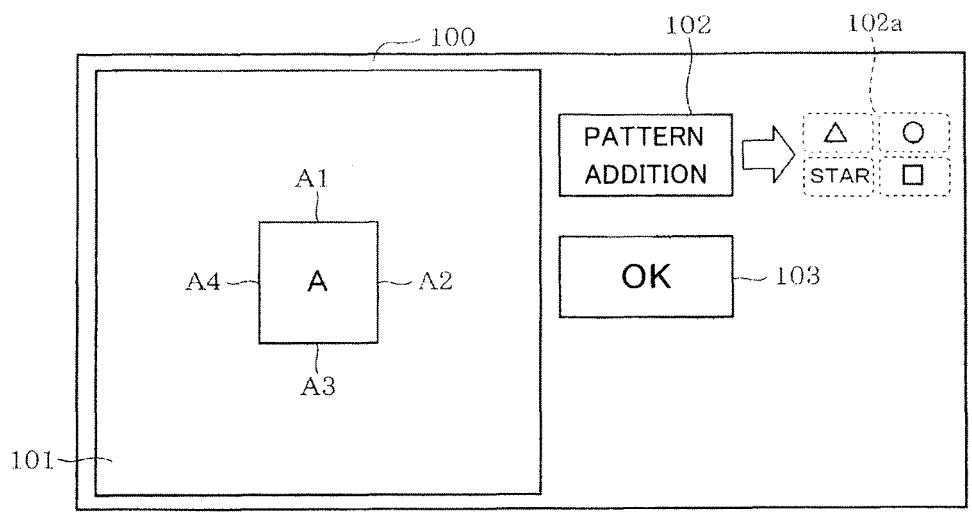
Figure 11B:
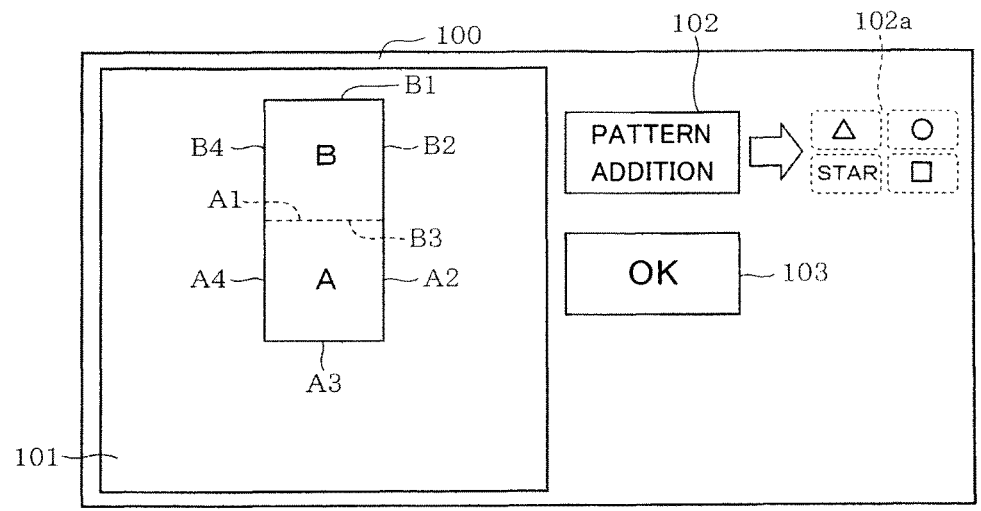
Figure 11C:
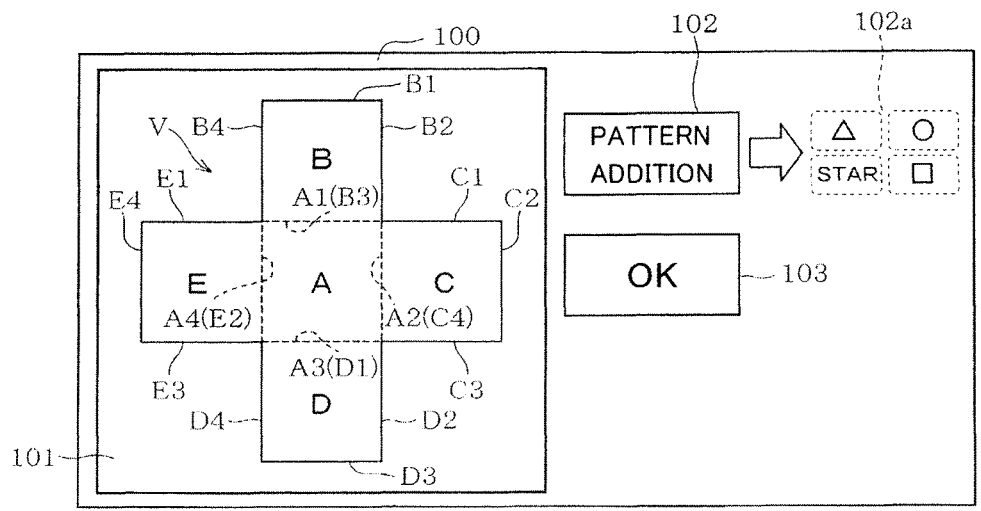
Figure 12A:
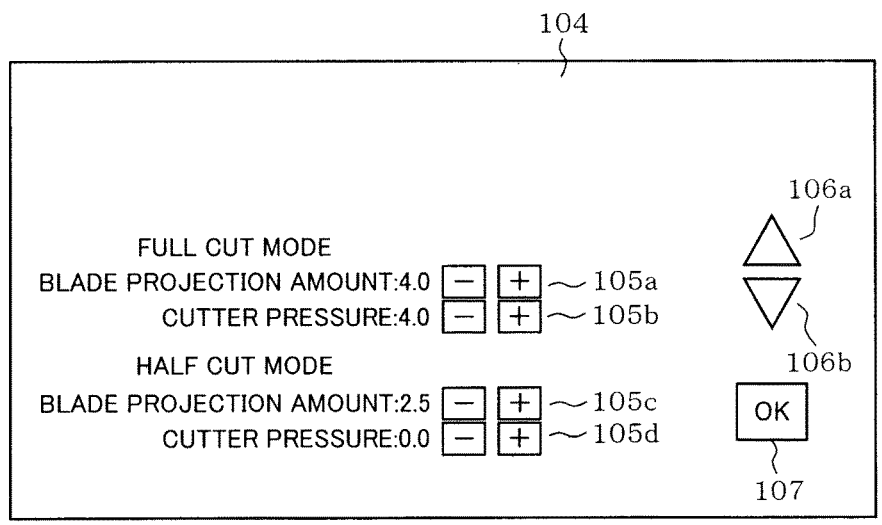
Figure 12B:
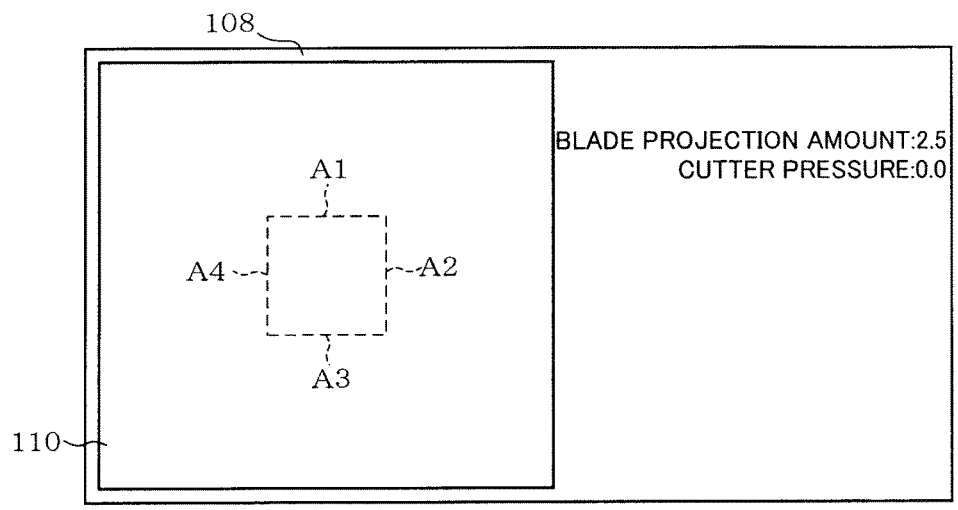
Figure 12C:
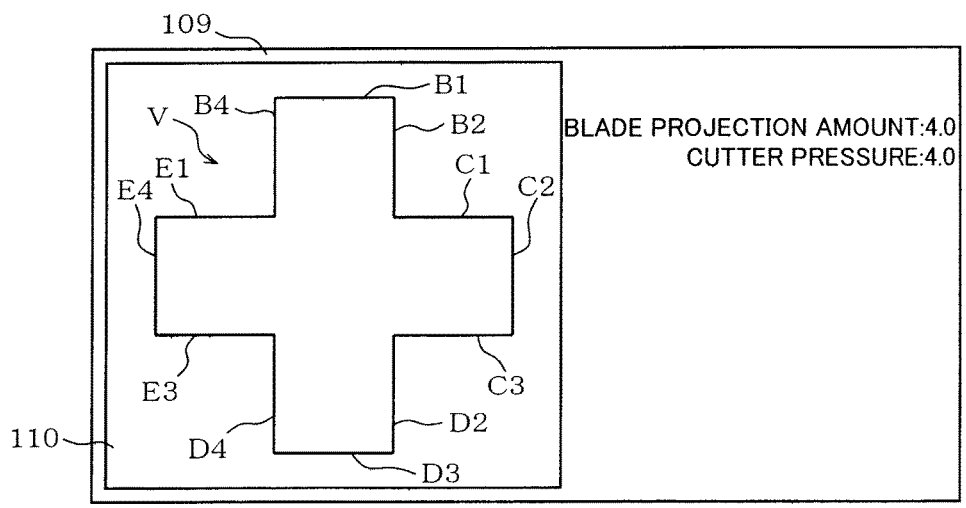
Figure 13:
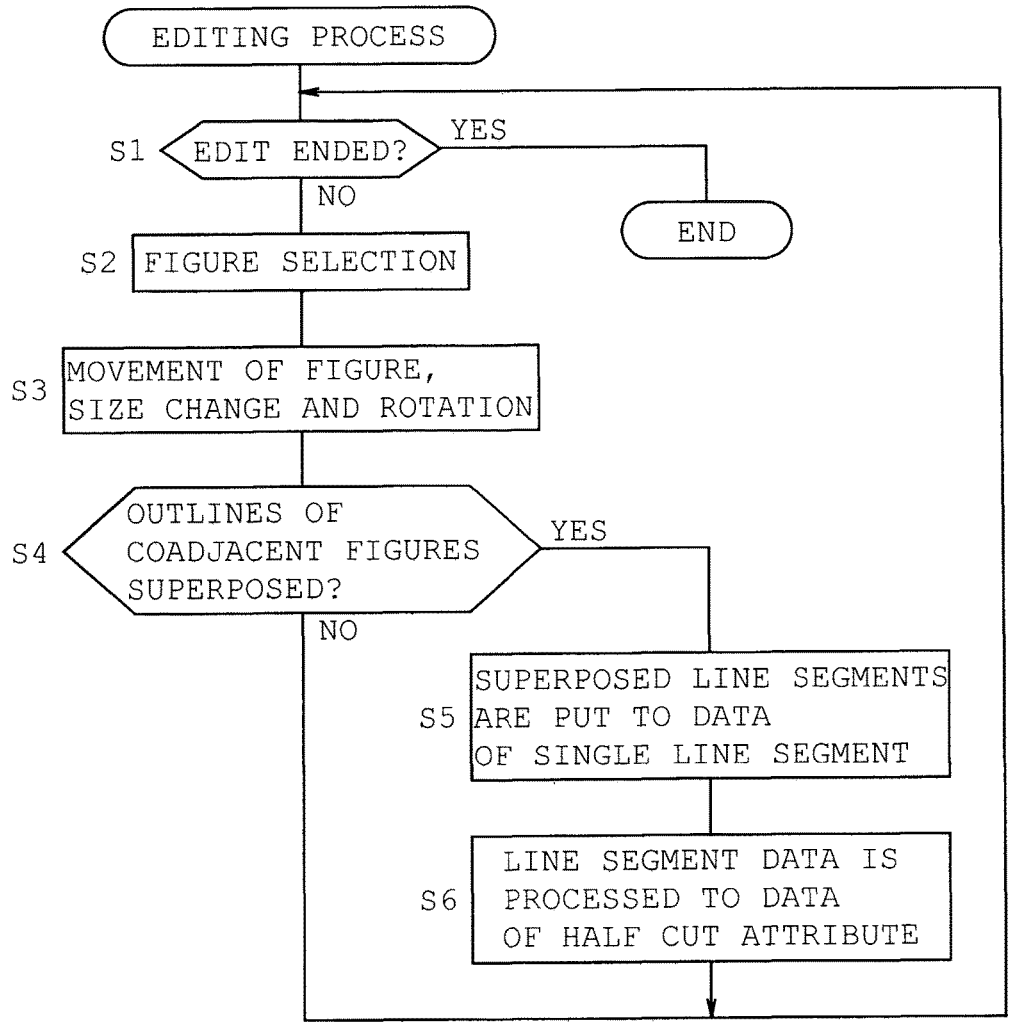
Figure 14:
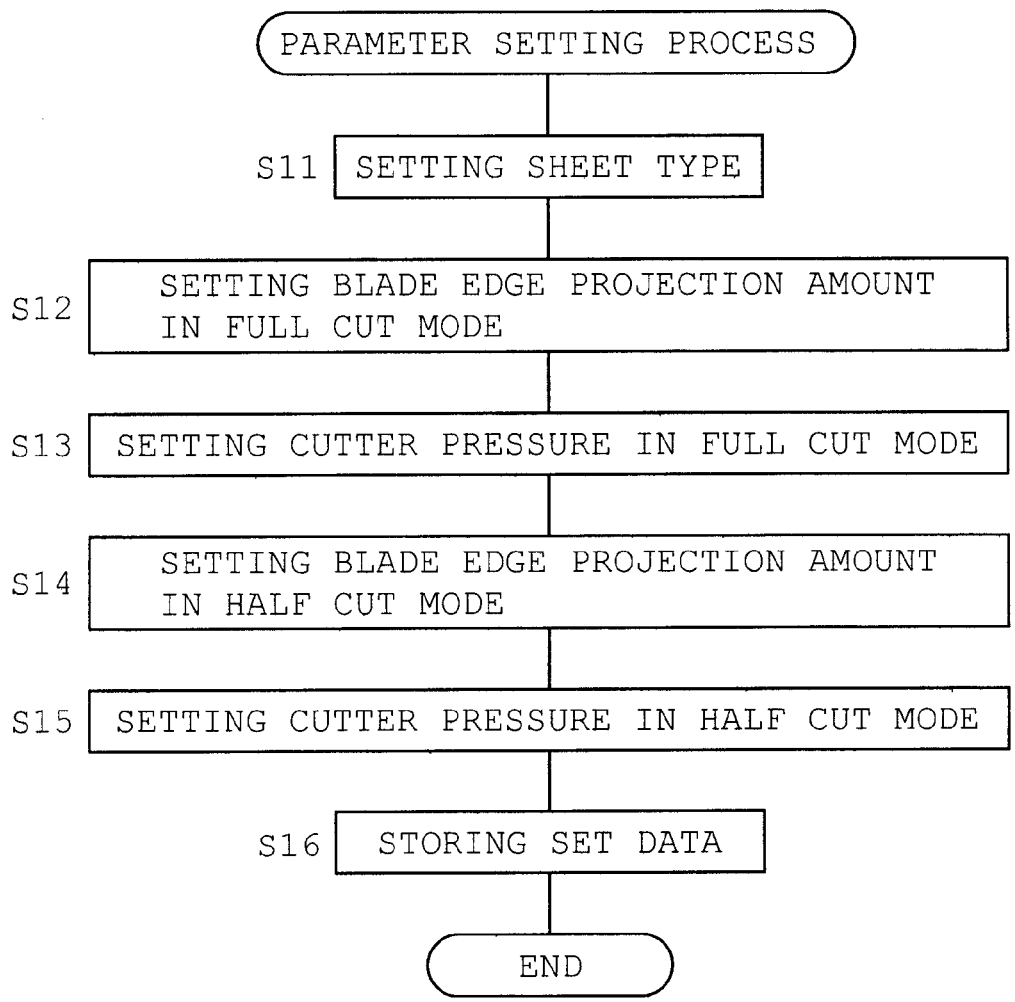
Figure 15:
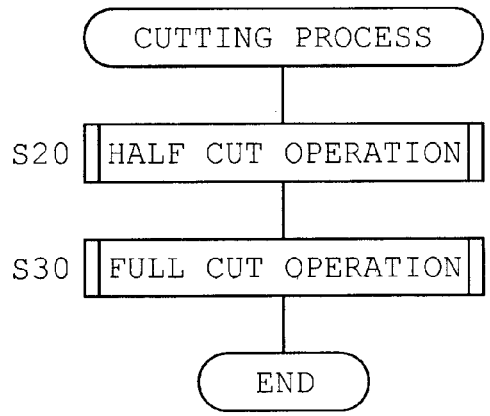
Figure 16:
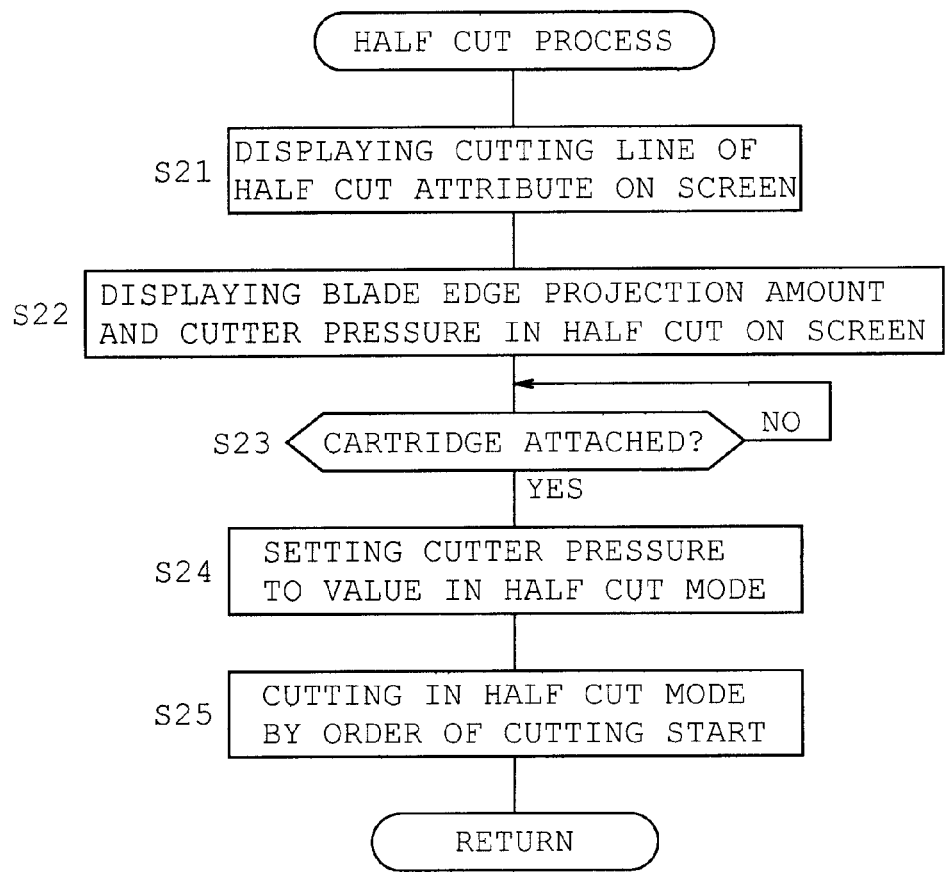
Figure 17:
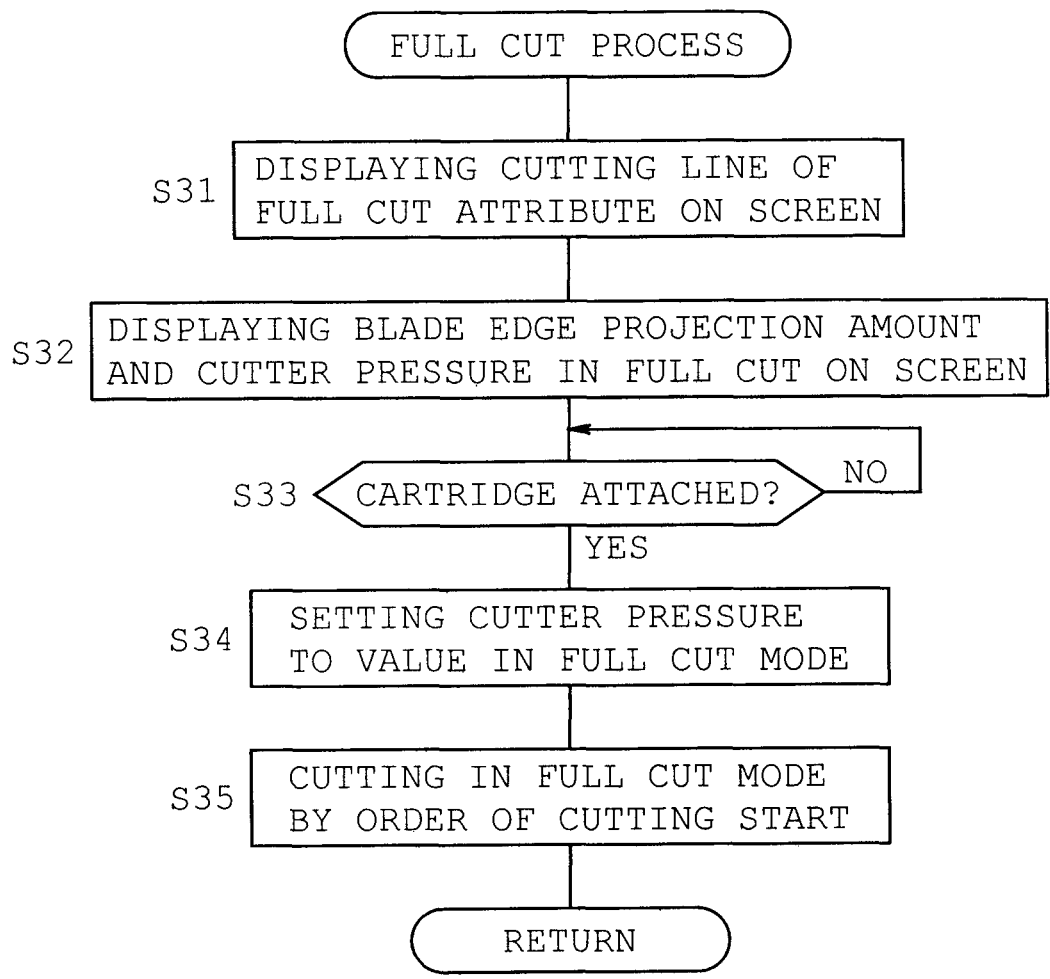

FIG. 8 explains an operating condition table;

FIGS. 9A and 9B show a cutting data, structure and an example of pattern respectively;

FIG. 10 is a perspective view of a box made from a composite figure as a developed diagram;

FIGS. 11A to 11C exemplify edit screens of the composite figure;

FIGS. 12A to 12C are a setting screen of operating conditions and examples of operating screens during cutting under the half cut mode and the full cut mode, respectively;

FIG. 13 is a flowchart showing an editing process;

FIG. 14 is a flowchart showing a parameter setting process;

FIG. 15 is a flowchart showing a cutting process;

FIG. 16 is a flowchart showing a half cat process;

FIG. 17 is a flowchart showing a rail cut process;

FIGS. 18A and 18B show a composite figure editing process in a second embodiment;

FIG. 19 shows another example of composite figure; and

Figure 7:
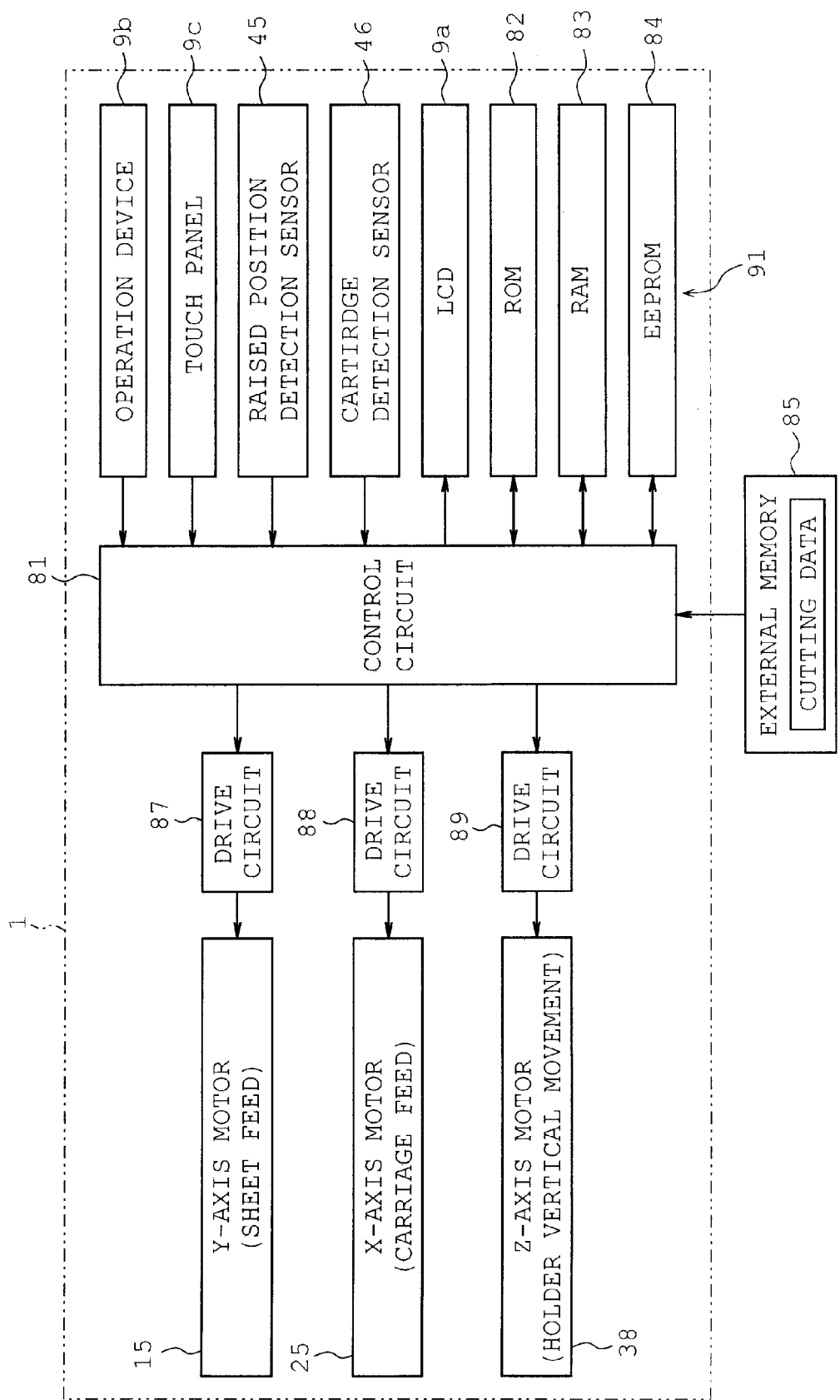
FIG. 7 is a block, diagram showing an electrical arrangement of the cutting apparatus.
Figure 20:
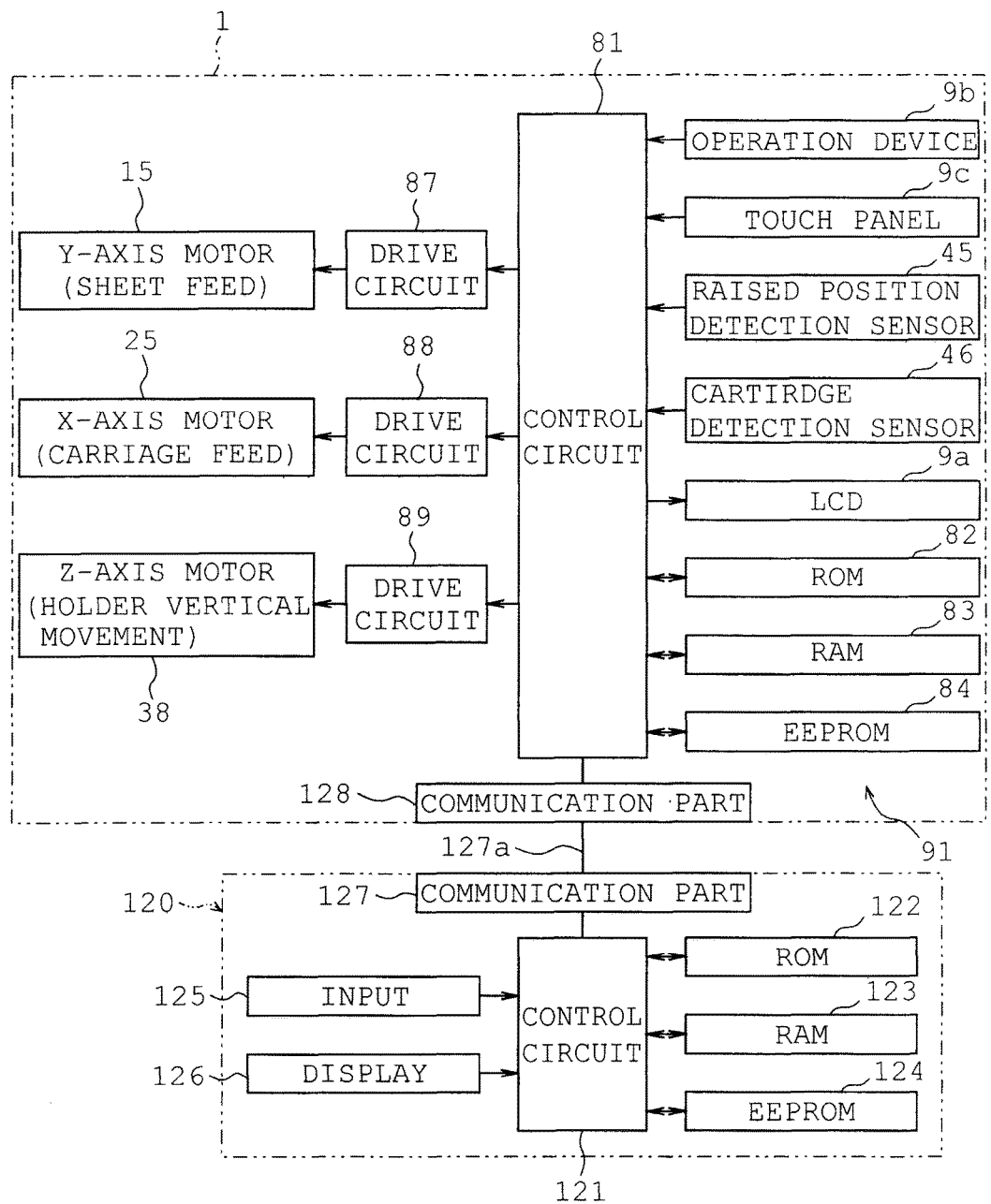

FIG. 20 is a view similar to FIG. 7, showing a third embodiment.

DETAILED DESCRIPTION

First Embodiment

Figure 1:
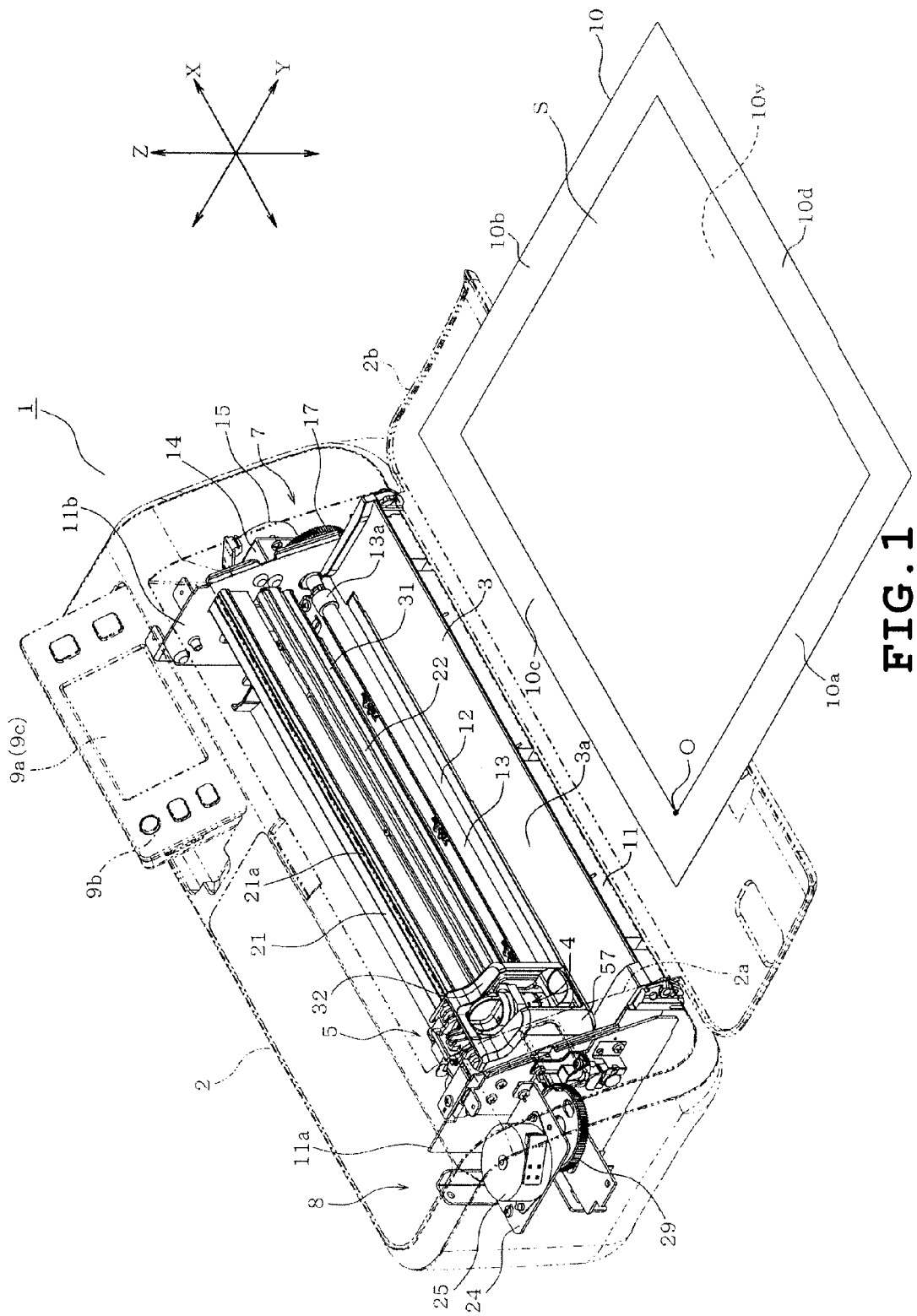
FIG. 1 is a perspective view of a cutting apparatus according to one embodiment, showing an inner structure of the cutting apparatus and a body cover.

A first embodiment will be described with reference to FIGS. 1 to 17. Referring, to FIG. 1, a cutting apparatus 1 is shown and includes a body cover 2 serving as a housing, a platen 3 provided in the body cover 2 and a carriage 5 on which a cartridge 4 (see FIG. 5) serving as a cutting unit is to be mounted. The cutting apparatus 1 further includes a holding member 10 for holding a sheet S to be cut.

The body cover 2 is formed into the shape of a horizontally long rectangular box. The body cover 2 has a front formed with a front opening 2a. A front cover 2b is mounted on the front of the body cover 2 to open and close the front opening 2a. The holding member 10 holding the sheet S is set onto the platen 3 while the front opening 2a is open, or the cartridge 4 is attached to or detached from a cartridge holder 32 of the carriage 5.

The cutting apparatus 1 is provided with a transfer mechanism 7 and a carriage moving mechanism 8. The transfer mechanism 7 transfers the sheet S in a predetermined transfer direction (the Y direction). The carriage moving mechanism 8 moves the carriage 5 in a direction intersecting with the transfer direction of the sheet S (for example, the X direction perpendicular to the transfer direction). In the following description, the direction in which the sheet S is transferred by the transfer mechanism 7 will be referred to as "front-back direction". That is, the front-back direction is the Y direction and the right-left direction perpendicular to the Y direction is the X direction.

A liquid-crystal color display 9a (hereinafter, "display 9a") and an operation device 9b including various operation switches (not shown) are mounted on a right upper surface of the body cover 2. The display 9a is capable of full color display and is configured to display information about various patterns, figures, messages necessary to the user, and the like. A touch panel 9c having a transparent matrix touch switch for coordinate input is placed on a display surface side of the display 9a. The touch switch employs a resistance value detection system, for example. The touch switch of the resistance value detection system is comprised of resistors arranged at predetermined intervals in the longitudinal and lateral directions into a matrix. When the user touches any position on the touch switch, a cross point, of the resistors corresponding to the touched position is scanned with the result that the touched position is detected.

The operation device 9b or the touch panel 9c is operable for designation of an object to be displayed on the screen of the display 9a, selection of various figures and the like, the switching to various modes, the setting of various parameters, and the like.

Figure 2:
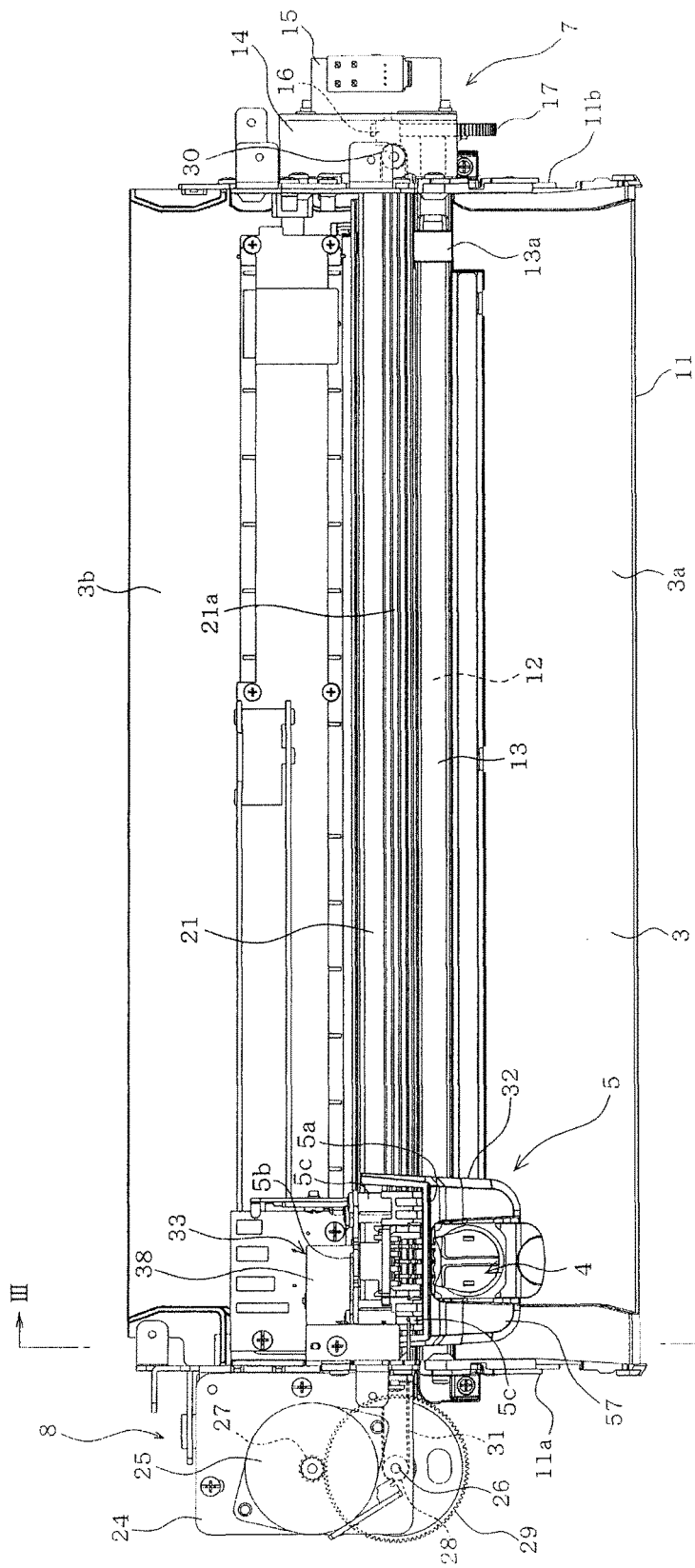
FIG. 2 is a plan vies of the cutting apparatus, showing the inner structure thereof.

The platen 3 receives the underside of the holding member 10 when the sheet S is processed. The platen 3 includes a front platen 3a and a rear platen 3b and has a horizontal upper surface as shown in FIG. 2. The holding member 10 holding the sheet S is transferred while being placed on the platen 3. The holding member 10 is formed into a rectangular sheet shape as shown in FIG. 1, for example. An adhesive layer 10v (see FIG. 6) is formed on an upper side of the holding member 10. The adhesive layer 10v is sensed by applying an adhesive agent to an inner region of the holding member 10 except for peripheral edges 10a to 10d. The sheet S attached to the adhesive layer 10v is held by the holding member 10. The adhesive layer 10v has an adhesive force which is set to a smaller value so that the sheet S can be easily removed. The transfer mechanism 7 and the carriage moving mechanism 8 are constructed into a moving device 20 which moves the holding member 10 holding the sheet S in the X direction and the carriage 5 in the Y direction relative to each other.

The transfer mechanism 7 transfers the holding member 10 on the upper surface side of the platen 3 freely in the Y direction. A frame 11 is enclosed in the body cover 2 as shown in FIGS. 1 and 2. The frame 11 includes right and left sidewalls 11b and 11a which are located at right and left sides of the platen 3 so as to face each, other, respectively. A driving roller 12 and a pinch roller 13 are mounted between the sidewalls 11a and 11b so as to be located in a space between the front and rear platens 3a and 3b. The driving roller 12 and the pinch roller 13 extend in the X direction and lined in the up-down direction. The driving roller 12 is located, below the pinch roller 13.

The driving roller 12 has an upper end which is substantially level with the upper surface of the platen 3 and right and left ends mounted on the right and left side walls 11b and 11a respectively so that the driving roller 12 is rotatable. The right end of the driving roller 12 extends rightward through the right sidewall 11b as shown in FIG. 2. A driven gear 17 having a large diameter is secured to the right end of the driving roller 12. A mounting frame 14 is fixed to an outer surface of the right sidewall 11b. A Y-axis motor 15 comprised of a stepping motor, for example is mounted on the mounting frame 14. The Y-axis motor 15 has an output shaft to which is fixed a driving gear 16 having a small diameter and is to be brought into mesh engagement with the driven gear 17.

The pinch roller 13 has right and left ends mounted on the right and left sidewalls 11b and 11a respectively so that the pinch roller 13 is rotatable and slightly displaceable in the up-down direction. Two springs (not shown) are mounted on outer surfaces of the right and left sidewalls 11b and 11a to normally bias the right and left ends of the pinch roller 13 downward. Accordingly, the pinch roller 13 is normally biased downward (to the driving roller 12 side) by the springs. Two rollers 13a having slightly larger diameters are mounted on the pinch roller 13 so as to be located near both ends thereof, respectively. Only the right roller 13a is shown in FIGS. 1 and 2.

The holding member 10 has right and left edges 10b and 10a held between the driving roller 12 and the rollers 13a of the pinch roller 13. Upon, normal or reverse rotation of the Y-axis motor 15, the rotation is transmitted via the gears 16 and 17 to the driving roller 12, whereby the holding member 10 is transferred rearward or forward together with the sheet S. The transfer mechanism 7 is thus comprised of the driving roller 12, the pinch roller 13, the Y-axis motor 15 and the gears 16 and 17 serving as a reduction mechanism.

The carriage moving mechanism 8 serves to move a carriage 5 freely in the X direction. A pair of guide rails 21 and 22 are fixed to the right and left sidewalls 11b and 11a so as to be located slightly rear above the pinch roller 13, as shown in FIGS. 1 and 2. The guide rails 21 and 22 extend in the right-left direction substantially in parallel to the pinch roller 13. The guide rails 21 and 22 have respective cross-sections which are substantially U-shaped as viewed in the extending direction pin the direction perpendicular to the plane of FIG. 3). The upper guide rail 21 and the lower guide rail 22 are disposed vertically symmetrically so that opening faces are opposed to each other.

Guide grooves 22a (shown only in FIG. 3) are formed in an upper surface of the guide rail 21 and an underside of the guide rail 22 so as to extend between the right and left ends although only the guide groove 21a of the upper surface is shown. Further, the carriage 5 has a pair of protrusions 23 which are formed on upper and lower portions thereof so as to sandwich the guide grooves 21a and 22a, respectively. The protrusions 23 extend in the right-left direction and engage the guide grooves 21a and 22s respectively. The carriage 5 is supported on the guide rails 21 and 22 so as to be slidable in the right-left direction.

A horizontal mounting frame 24 is fixed to the outer surface of the left sidewall 11a so as to be located near the rear of the left sidewall 11a at the outer surface side, as shown in FIGS. 1 and 2. An X-axis motor 25 is mounted on the mounting frame 24 so as to face downward. Furthermore, a vertically extending pulley shaft 26 (see FIG. 2) is mounted on the mounting frame 24 so as to be located 1a front of the X-axis motor 25. The X-axis motor 25 is comprised of a stepping motor, for example and has an output shaft to which a driving gear 27 having a small diameter is fixed. A timing pulley 28 and a driven gear 29 having a large diameter are rotatably mounted on the pulley shaft 26. The driven gear 23 is brought into mesh engagement with the driving gear 27. The timing pulley 28 and the driven gear 29 are configured to be rotated together.

On the other hand, a timing pulley 30 is mounted on the right mounting frame 14 so as to be rotatable about an axis extending in the up-down direction. An endless timing belt 31 horizontally extends between the timing pulleys 30 and 28 in the right-left direction. The timing belt 31 has a midway part joined to a mounting part (not shown) of the carriage 5.

Upon normal or reverse rotation of the X-axis motor 25, the rotation is transmitted via the gears 27 and 23 and the timing pulley 28 to the timing belt 31, whereby the carriage 5 is moved leftward or rightward. Thus, the carriage 5 is moved in the right-left direction perpendicular to the direction in which the sheet S is transferred. The carriage moving mechanism 8 thus includes the guide rails 21 and 22, the X-axis motor 25, the gears 27 and 29 serving as a reduction mechanism, the timing pulleys 28 and 30, the timing belt 31 and the like.

Figure 3:
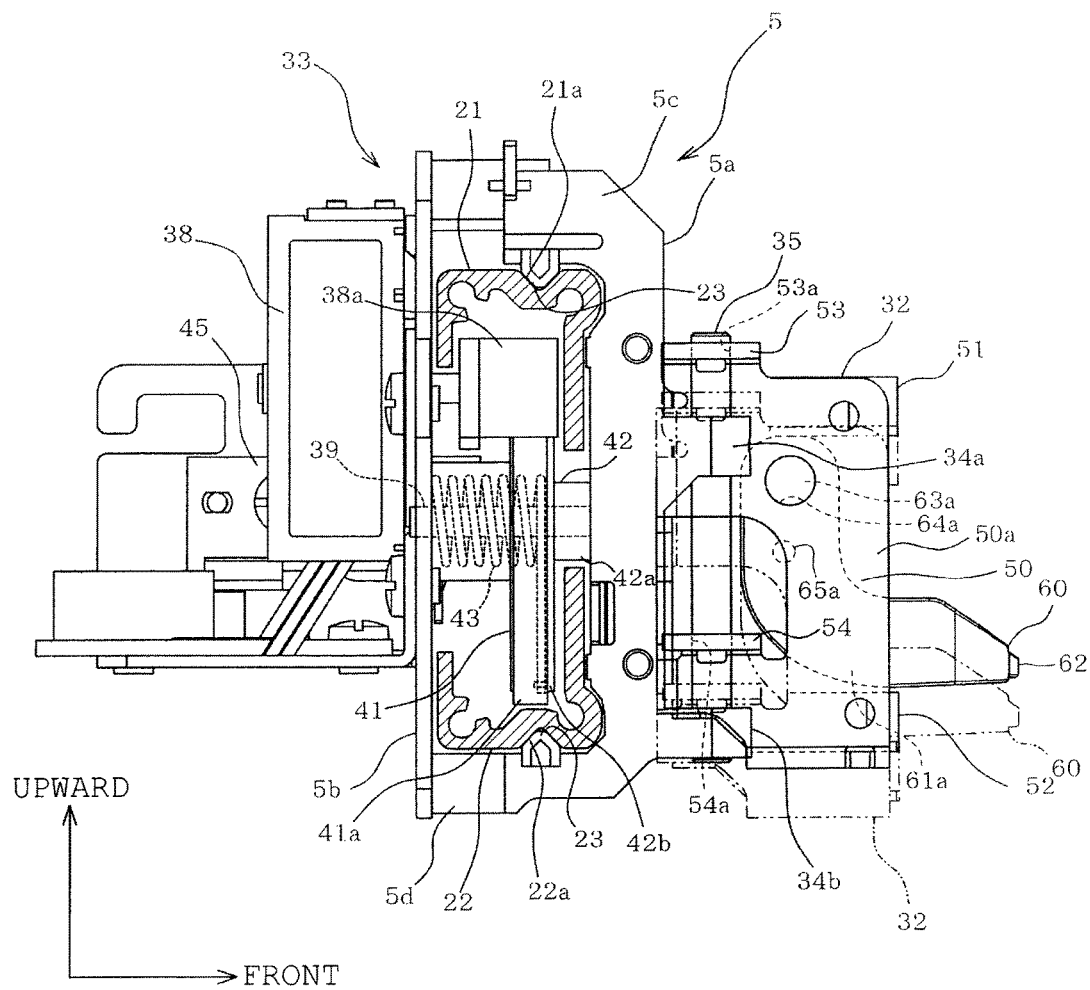
FIG. 3 is a longitudinally section left side view taken along line III-III in FIG. 2.
Figure 4:
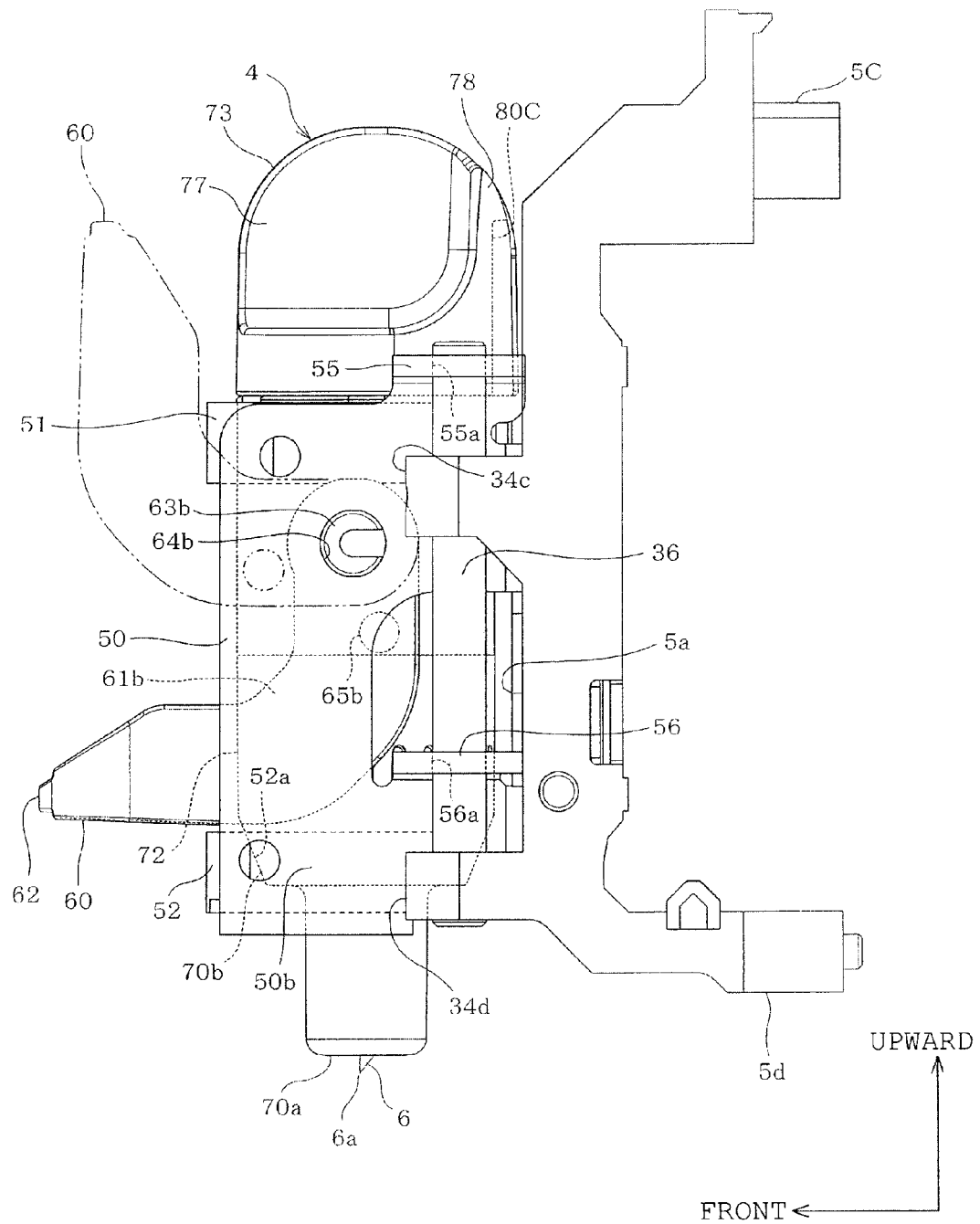
FIG. 4 is a right side elevation of a cartridge holder and its vicinity with a cartridge holder being attached.

The carriage 5 includes a cartridge holder 32 and an up-down drive mechanism 33 in front and in the rear thereof as shown in FIGS. 2 and 3. The up-down drive mechanism 33 is configured to drive the cartridge holder 32 in the up-down direction (the Z direction) together with the cartridge 4. The carriage 5 includes front and rear walls 19a and 19b and upper and lower arms 19c and 19d connecting the walls 19a and 19b, as shown in FIG. 3. Thus, the carriage 5 is formed to surround she front and rear sides and upper and lower sides of the guide rails 21 and 22. A pair of upper and lower supports 34a and 34b are provided on a left end of the front wall 5a so as to protrude forward. A round bar-shaped shaft 35 are fixed to the supports 34a and 34b so as to vertically extend through the supports 34a and 34b. A right end of the front wall 5a is also provided with supports 34c. and 34d, as shown in FIG. 4. A shaft 36 is fixed to the supports 34a and 34d. The shafts 35 and 36 are inserted through both sides (holes 53a to 56a of support pieces 52 to 56 as will be described later; and see FIGS. 3 and 4) of the cartridge holder 32 so that the cartridge holder 32 is supported to be vertically movable.

The cartridge 5 has an upper arm 5c on which is mounted the protrusion 23 engaging the guide groove 21a of the guide rail 21, as shown in FIG. 3. The cartridge 5 also has a lower arm 5d on which is mounted the protrusion 23 engaging the guide groove 22a of the guide rail 22. A Z-axis motor 38 is mounted on an upper part of the rear wall 5b of the carriage 5 so that an axis thereof is directed frontward. The Z-axis motor 38 is comprised of a stepping motor, for example. The Z-axis motor 38 has an output shaft to which a driving gear 38a having a small diameter is fixed. A gear shaft 39 is also mounted on the rear wall 5b so as to be located in the lower right of the Z-axis motor 38. A driven gear member 41 and a pinion gear member 42 are rotatably mounted on the gear shaft 39.

The driven gear member 41 has a smaller diameter portion and a larger diameter portion both formed integrally therewith. The larger diameter portion is formed with a gear 41a brought into mesh engagement with the driving gear 38a. The driven gear member 41 has a spring housing formed therein and having a front-opening. A torsion coil spring which will be described later is housed in the spring housing. The pinion gear member 42 has a flange 42b and a smaller diameter portion both formed therewith. The flange 42b covers the housing of the driven gear member 41 from the front. The smaller diameter portion of the pinion gear member 42 is formed with a gear 42a. The torsion coil spring 43 as shown in FIG. 3 is housed in the spring housing of driven gear member 41. The torsion coil spring 43 has one of two ends engaged with the driven gear member 41 side thereby to be locked and the other end engaged with the pinion gear member 42 side thereby to be looked. A rack (not shown) formed integrally with the cartridge holder 32 is brought into mesh engagement with the gear 42a of the pinion gear member 42.

Upon normal or reverse rotation of the Z-axis motor 38, a driving force is transmitted to the rack through the driving gear 38a, the driven gear 41, the torsion coil spring 43 and the pinion gear member 42. As a result, the cartridge holder 32 is moved upward or downward together with the cartridge 4 thereby to be moved between a raised position and a lowered position (see two-dot chain line in FIG. 3). Cutting by the cutter 6 of the cartridge 4 is executed when the cartridge holder 32 is located at the lower position. A blade edge 6a as shown in FIG. 4 is spaced from the sheet S by a predetermined distance when the cartridge holder 32 is located at the upper position.

A raised position detection sensor 45 is provided on the rear wall 5b of the carriage 5 as slightly shown in FIG. 3 and also as shown in FIG. 7. The raised position detection sensor 45 is an optical sensor configured to detect the raised position of the cartridge holder 32. The raised position detection sensor 45 is comprised of a photointerrupter which detects a rotational position of a shutter piece (not shown) provided so as to be rotated together with the driven gear member 41. As a result, the raised position of the cartridge holder 32 on which the cartridge 4 is mounted is defined by a detection signal of the raised position detection sensor 45. Further, a cartridge detection sensor 46 is provided on the front wall 5a of the carriage 5 (see FIG. 7). The cartridge detection sensor 46 has a contact which is brought into contact with the cartridge 4 attached to the cartridge holder 32. The cartridge detection sensor 46 is configured, to detect presence or absence of the cartridge 4 by the contact. An up-down drive mechanism 33 is comprised of the Z-axis motor 38, the gear members 38a, 41 and 42 serving as a redaction mechanism, the torsion coil spring 43 and the rack.

The rotational movement of the Z-axis motor 38 is transmitted to the pinion gear member 42 via the driven gear member 41 and the torsion coil spring 43 and converted to an up-down movement between, the pinion gear member 42 and the rack. The conversion will be described in detail. When the Z-axis motor 38 is rotated clockwise as viewed from the front, the driven gear member 41 is rotated counterclockwise as viewed from the front. This rotates the pinion gear member 42 counterclockwise via the torsion coil spring 43. Upon counterclockwise rotation of the pinion gear member 43, the gear 42a moves the rack of the cartridge holder 32 downward. Thus, the cartridge holder 32 or the cartridge 4 is moved downward from the raised position. When the blade edge 6a and the underside of the cartridge 4 are pressed against the sheet S (see FIG. 6), a further downward movement of the cartridge 4 is disallowed. In this case, the pinion gear member 42 cannot be rotated further thereby to be stopped.

However, only the driven gear member 41 is rotated when the Z-axis motor 38 is subsequently kept rotating. Accordingly, the torsion coil spring 43 is flexed in a winding direction. As a result, the cutting pressure at the blade edge 6a side is set to an actuation force proportional to a deflection angle of the torsion coil spring 43. This pressure will hereinafter be referred to as "cutter pressure." Thus, when the cartridge holder 32 is located at the lowered position, the actuation force of the torsion coil spring 43 is set based on an amount of rotation of the X-axis motor if, whereby a predetermined cutter pressure is obtained. The value of the cutter pressure is changeable by the user as will be described in detail later.

On the other hand, the driven gear member 41 is rotated clockwise when the Z-axis motor 38 is rotated counterclockwise. This causes the driven gear member 43 to directly press the pinion gear member 42 with the result that the driven gear member 41 is rotated clockwise. Here specifically, the torsion coil spring 43 does not act when the driven gear member 41 is rotated clockwise. The clockwise rotation of the pinion gear member 42 moves the gear 42a upward. Thus, the cartridge holder 32 or the cartridge 4 is moved upward from the lowered position.

The cartridge holder 32 includes a holder frame 30 provided with the rack, and an upper holder 51 and a lower bolder 52 both fixed to the holder frame 50, as shown in FIGS. 3 and 4. The holder frame 50 has a left wall 50a from which a pair of upper and lower support pieces 53 and 54 protrude outward as shown in FIG. 3. The holder frame 50 also has a right wall 50b from which a pair of upper and lower support pieces 55 and 56 protrude outward as shown in FIG. 4. The support pieces 53 to 56 are formed with through holes 53a to 56a respectively.

The shaft 35 of the carriage 5 is inserted through the holes 53a and 54a of the left support pieces 53 and 54, and the shaft 36 of the carriage 5 is inserted through the holes 55a and 56a of the support pieces 55 and 56. The holder frame 50 is thus supported to be movable upward and downward along the shafts 35 and 36 of the carriage 5. The carriage 5 is provided with a cover member 57 (see FIGS. 1 and 2) covering the support pieces 53 to 56 and the shafts 35 and 36. The cover member 57 has a centrally formed hole through which are exposed inner walls of the upper holder 51, the lower holder 52 and the holder frame 50.

The upper and lower holders 51 and 52 are attached so that the cartridge 4 is inserted through the upper and lower holders 51 and 52 from above. Each one of the upper and lower holders 51 and 52 is formed into such a frame shape as to fit into the holder frame 50. The holders 51 and 52 have respective inner diameters which are set so as to fit with the outer periphery of the cartridge 4 to be attached although not shown in detail. The lower holder 52 has a tapered portion 52a (see FIG. 45 which abuts against a tapered portion 70b of the cartridge 4. The tapered portion 52a prevents the cartridge 4 from downward movement.

The holder frame 50 includes a lever member 60 serving as a pressing unit which presses the cartridge 4. The lever member 60 has a pair of right and left arms 61a and 61b and an operating portion 62 provided to connect distal ends of the arms 61a and 61b. The arms 61a and 61b are each formed into a plate shape and disposed to interpose both sides of the cartridge 4. Further, the lever member 60 has a proximal end provided with two small columnar pivot shafts 63a and 63b located at outer peripheral sides of the arms 61a and 61b respectively. The support shafts 63a and 63b are inserted through circular holes 64a and 64b formed through the walls 50a and 50b of the holder frame 50 respectively. As a result, the lever member 60 is pivotable about the pivot shafts 63a and 63b so as to be switched between an open position as shown by two-dot chain line in FIG. 4 and a fixed position as shown by solid line.

Further, the arms 61a and 61b have small columnar engagement portions 65a and 65b which are provided on the inner sides of the arms 61a and 61b so as to be located near the pivot shafts 63a and 63b respectively. The engagement portions 65a and 65b engage an upper end of the cap 72 from above when the lever member 60 is located at the fixed position. As the result of engagement of the engagement portions 65a and 65b with the cap 72, the cartridge 4 is fixed while the lower holder 52 is in abutment on the tapered portion 52a (see FIG. 4). On the other hand, the engagement portions 65a and 65b depart from the cap 72 thereby to be released from the fixed state with the swinging movement from the fixed position side to the open position side. Thus, the cartridge 4 is pressed by pressing the cartridge 4 by the engagement portions 65a and 65b thereby to be fixed to be releasable from the fixed state.

Figure 5:
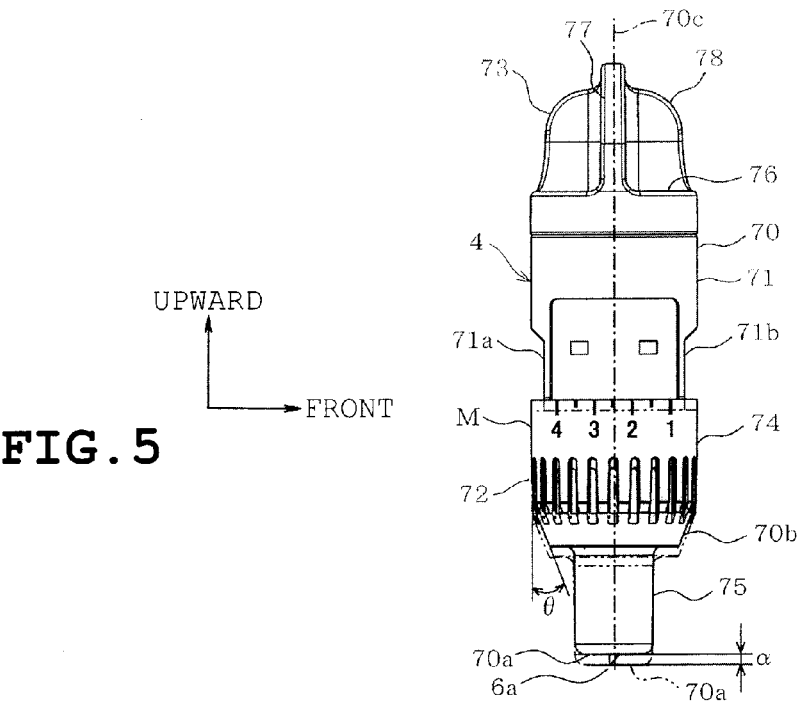
FIG. 5 is a front view of cutter cartridge.
Figure 6:
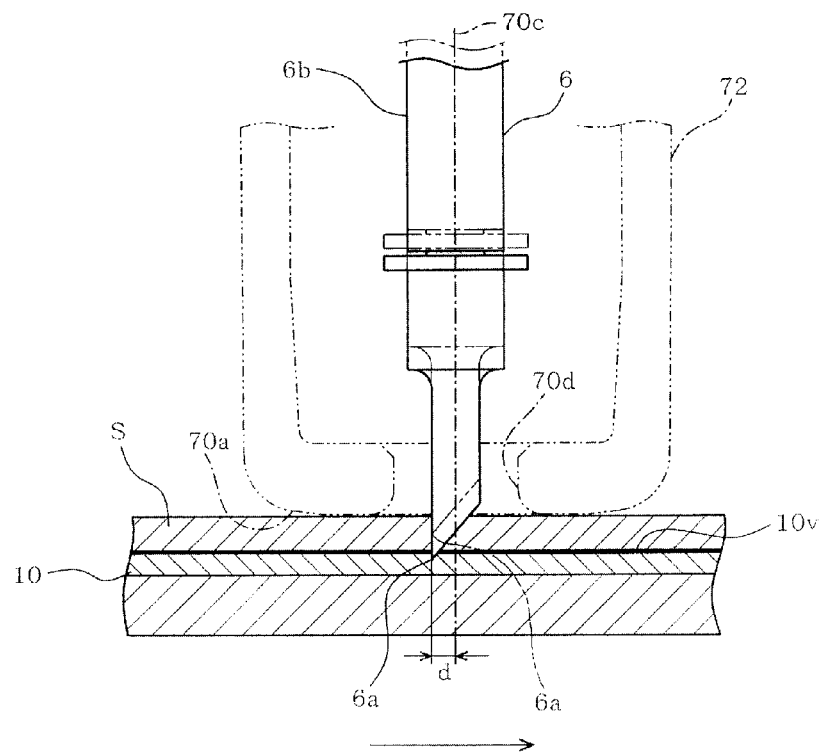
FIG. 6 is an enlarged view of the distal end of the cutter and its vicinity during cutting.

The cartridge 4 attached to and detached from the cartridge holder 32 will be described with reference to FIG. 5 as well as FIGS. 1 to 4. The cartridge 4 includes the cutter 6 serving as the cutting blade 6 and outer shell case 70 housing the cutter shaft 6b of the cutter 6 (see FIG. 6). The cutter 6 includes a round bar shaped cutter shaft 6b serving as a base and a blade of the distal end (lower end), both of which are formed integrally with the cutter 6. The blade of the cutter 6 is formed into a generally triangular shape and inclined relative to the sheet S, as shown in FIG. 6. The blade edge 6a that is a lowermost end of the blade is formed at a position decentered by distance d from a central axis line 70c of the cutter shaft 6b, as shown in FIG. 6.

The case 70 includes a case body 71 and a cap 72 and a knob 73 provided on one and the other ends of the case body 71 respectively. The case body 71 is formed into a cylindrical shape and extends in the up-down direction. The case body 71 has right and left sides formed with escape portions 71a and 71b which are located in a vertically middle part thereof so that the case body 71 maybe avoided to contact the engagement portions 65a and 65 of the lever member 65. Bearings are provided in the case body 71 to support the cutter shaft 6b so that the cutter shaft 6b is rotatable about the central axis line 70c.

The cap 72 includes a larger diameter portion 74 fitted with the case body 71 and a smaller diameter portion 75 and is formed into the shape of a stepped bottomed cylindrical reservoir. The larger diameter portion 74 has a lower part provided with a tapered portion 70b which is formed over an entire circumference. The tapered portion 70b has the shape of a circular truncated cone and abuts against the tapered potion 52a of the cartridge bolder 32. The tapered portion 70b has the same inclined angle θ as the tapered portion 52a of the cartridge, bolder 32. Further, the tapered portion 70b has a center corresponding to the central axis line 70c of the cutter shaft 6b. The larger diameter portion 74 has an upper end or a circumferential edge of the cap 72 pressed by the engagement portions 65a and 65b of the lever member 60, The cap 72 has an underside 70a which is formed into a flat shape and has a through hole (see FIG. 6) through which the blade edge 6a of the cutter 6 is inserted.

The case body 71 baa an outer periphery formed with a male thread located below the escape portions 71a and 71b although the male thread is not shown. The larger diameter portion 74 of the cap 72 has an inner periphery formed with a female thread which is engaged with the male thread of the case body 71. As the result of threading engagement of the male and female threads, the cap 72 is joined to the case body 71 so that the position thereof is adjustable in the direction of the center axis line 70c. The female thread has a thread pitch set according to an adjusting allowance of an amount of projection of the blade edge 6a as shown in FIG. 5. More specifically, the adjusting allowance α is defined as a distance between a housed position where the underside 70a and the blade edge 6a meet together (see two-dot chain line in FIG. 5) and a maximum projection position where the upper end is engaged with a lock portion (not shown) of the case body 71 thereby to be locked.

The surface of the cap 72 is provided with a numerical scale M which gives an indication when an amount of projection of the blade edge 6a is adjusted within a range of the adjusting allowance α in the embodiment. For example, assume that the thread pitch and the adjusting allowance α are set at substantially the same value and that the projection amount of the blade edge 6a is shown by Line numerical scale M of "0" to "7." In this case, when the cap 72 is rotated from "0" indicative of the housed position to scale markings "2," "4" to "6," an amount of projection of the blade edge 6a can be adjusted to ¼, ½ to ¾ of the maximum projection amount α sequentially. An axial dimension of the male thread is set to be slightly larger than the adjusting allowance α. As a result, the cap 72 is prevented from dropping off from the case body 71 even when the cap 72 is rotated slightly excessively in a scale decrementing direction from scale "0."

The cap 72 is then rotated with the numeric scale M serving as a guide according to a thickness and a type of the sheet S, so that the blade edge 6a is set to an amount of projection suitable for the forming of a first or second cut line. In the following description, the first cut line will be referred to as "full out line" and the second out line will be referred to as "half cut line" for clear distinction of the first and second Cut lines. The full cut line is a cutting-plane line along which the sheet S is completely cut while the blade edge 6a has penetrated the sheet S on the holding member 10 in the thickness direction and slightly run into the holding member 10, as shown in FIG. 6. On the other hand, the half cut line is formed on the surface of the sheet S in the form of a groove with the blade edge 6a not penetrating the sheet S (see two-dot chain line in FIG. 6).

The knob 73 has a cover plate 76 fixed to an upper surface of the case body 71, a knob plate 77 provided on the upper aide of the cover plate 76 and a rear plate 78, all of which are formed integrally with the knob 73. The knob plate 77 stands vertically from, a horizontally central part of the cover plate 76. The user can attach and detach the cartridge 4 to and from the cartridge holder 32 while pinching the knob plate 77.

In cutting she sheet S, the user rotates the cap 72 to adjust an amount of projection of the blade edge 6a and attaches the cartridge 4 to the cartridge holder 32. A control circuit 81 (see FIG. 7) which will be described later controls the up-down drive mechanism to move the cartridge 4 attached to the cartridge holder 32 to the lowered position and sets the cartridge 4 to the aforementioned cutter pressure. In this case, the blade edge 6a is pressed against the sheet S on the holding member 10 thereby to penetrate the sheet S or to run into the sheet S without penetration. The transfer mechanism 7 and the carriage moving mechanism 8 are operated in this state to move the holding member 10 and the cartridge 4 (the cutter 6) in the X and Y directions relative to each other, respectively.

As a result, a cutting operation is executed with respect to the sheet S in a half out mode to form a half cut line or a full cut mode to form a full cut line. An X-Y coordinate system is set in the cutting apparatus 1 while the left corner of the adhesive layer 10v of the holding member 10 as shown in FIG. 1 serves as an origin O, for example. The relative movement of the holding member 10 (the sheet S) and the cutter 6 is carried out on the basis of the X-Y coordinate system.

The configuration of the control system of the cutting apparatus 1 will now be described with reference to FIG. 7. The control circuit 81 (a control device) controlling the entire cutting apparatus 1 comprises a computer (a CPU) as a main component. A ROM 82, a RAM 83, an EEPROM 84 and an external memory 85 are connected to the control circuit 81.

The ROM 82 stores a cutting control program for controlling the cutting operation, a display control program for controlling a displaying operation of the display 9a, a cutting data generating program which will be described later, and the like. The external memory 85 stores cutting data used to cut a plurality of types of patterns. The RAM 83 temporarily stores data or programs necessary for various processes. The EEPROM 84 stores an operating condition table which correlates types of the sheets S with cutting conditions of the half cut line and the full cut line.

FIG. 8 exemplifies operating conditions of an amount of projection of the blade edge 6a and cutter pressure in the form of numerical value with respect to Kent paper and heavy paper each of which serves as sheet S. The numerical value indicative of amounts of projection of the blade edge 6a correspond to the numerical scale M of the cartridge 4. The numerical value of cutter pressure correspond to the aforementioned pressure of the blade edge 6a. The numerical values are set according to types of sheets S so that cutting operations in the half cut mode and the full cut mode become optimum cutting conditions for every type of sheet S.

The Kent paper has a smaller thickness than the heavy paper and a flat and smooth surface and is hard. Accordingly, an amount of projection of the blade edge 6a regarding Kent paper is smaller than regarding heavy paper both in the half cut mode and in the full cut mode. Further, the cutter pressure regarding Kent paper is smaller than regarding heavy paper in the half cut mode. Thus, the operating condition table stores as default values the conditions of cutting operations in the half and full cut modes for every type of sheet S. The values of the operating condition table can be changed to any values by the user as will be described in detail later.

Signals generated by toe raised position detection sensor 45, the cartridge detection sensor 46 and the like are supplied to the control circuit 81. Further, the display 9a and the touch panel 9c and various operation switches of the operation device 9b are also connected to the control circuit 81. While viewing the display 9a, the user operates one or more operation switches of the operation device 9b or one or snore of the touch switches of the touch panel 9c, thereby being capable of selecting a desired pattern or figure and setting various operation modes and parameters. The control circuit 81 is further connected to drive circuits 87, 88 and 89 driving the Y-axis motor 15, the X-axis motor 25 and the Z-axis motor 38 respectively. The control circuit 81 controls the Y-axis motor 15, the X-axis motor 25 and the Z-axis motor 38 based on cutting data, thereby automatically executing a cutting operation for the sheet S on the holding member 10 in the half or full cut mode.

The cutting data will be described with an example in which a pattern is cot out of the sheet S held on the holding member 10, in the full cut mode. Assume that a pattern A is a figure of a square. The cutting data in this case includes feed data, first to fourth coordinate data, an end code, display data (not shown) and an attribute flag of full cut line, as shown in FIG. 9A. The attribute flag is data affixed to discriminate between half cut line and full cut line in a pattern. An attribute flag of full cut line is affixed to an outline of pattern A.

The coordinate data is data of coordinate values representing apexes of a cutting line composed of a plurality of line segments in an X-Y coordinate and is defined by the X-Y coordinate system, of the cutting apparatus 1. More specifically, the cutting line of pattern A as shown in FIG. 9B includes four line segments A1, A2, A3 and A4 and is a figure of closed outline with a cutting start point $P_0$ and a cutting end point $P_4$ corresponding with each other. Cutting line data of pattern A has feed data (Fx0, Fy0), first coordinate data (x1, y1), second coordinate data (x2, y2), third coordinate data (z3, y3) and fourth coordinate data (x4, y4) corresponding to the cutting start point $P_0$, apex $P_1$, apex $P_2$, apex $P_3$ and cutting end point $P_4$ respectively. The feed data is used to move the cutter 6 to the cutting start point $P_0$ in starting the cutting of pattern A. In other words, the carriage 5 is moved to the cutting start point $P_0$ in the feed without cutting and the cutter 6 is moved up and down, based on the feed data.

The control circuit 81 is configured as a control unit which causes the cutting apparatus to execute a cutting operation to cut the pattern A based on the cutting data. More specifically, the cutter 6 is firstly moved to the X-Y coordinate of cutting start point $P_0$ by the transfer mechanism 7 and the carriage moving mechanism 8. The control circuit 81 then actuates the up-down drive mechanism 33 to cause the blade edge 6a of the cutter 6 to penetrate the sheet S at the cutting start point $P_0$, and the cutting apparatus 1 is set to a cutter pressure in the full cut mode. In this state, the blade edge 6a is moved toward the coordinate of the end point P1 of the line segment A1, by the transfer mechanism. 7 and the carriage moving mechanism 8, so that the sheet S is cut along the line segment A1.

Regarding the next line segment A2, the same cutting as the line segment A1 is continuously carried out with the end point P1 of the line segment A1 serving as a starting point. Thus, regarding line segments A2 to A4, too, the cutter 6 is moved so that the pattern A or the square figure is cut out. In the half out mode, a half cut line is formed by the use of the same coordinate data (Fx0, Fy0) to (x4, y4) as in the full cut mode although the conditions of the cutting operation differ from those in the half cut mode.

The cutting apparatus 1 of the embodiment is provided with a function of displaying a pattern on the display 9a and editing the pattern. The cutting apparatus 1 then generates cutting data of the edited pattern. Screens displayed on the display 9a in the edit of pattern and generation of cutting data will be described with reference to FIGS. 11A to 11C and 12A to 12C. FIGS. 11A to 11C show an editing screen 100 to edit a pattern so that the pattern becomes one desired by the user. The editing screen 100 is provided with a preview image area 101 displaying an image of pattern to be edited and icons 102 and 103 as shown in FIG. 11A. When the touch switch corresponding to the icon 102 on the touch panel 9c is touched by a finger (a touch operation), one of patterns stored in the external memory 85 or the like is selected. In this case, a list 102a of patterns to be selected includes diagrams representing straight lines and curved lines for drawing an outline of figure as well as the aforementioned figures of "square," "circle," "triangle," "star" and the like.

When selected from the pattern list 102a on the editing screen 100 by the touch operation, the figure of "square" is displayed in the preview image area 101 with a suitable reduced scale according to the size of the holding member 10 (or the sheet S). Assume now that the figure (the pattern) displayed in the preview image area 101 is also designated by symbol "A" that is the same as designating the pattern to be cut out of the sheet S.

The displayed figure A can be moved to any position by dragging the figure A with the touch operation within the outline. More specifically, lateral and longitudinal coordinates on the touch panel 9c on the screen of the display 9a correspond to the aforesaid X and Y directions respectively. The touch panel 9c outputs X coordinate and Y coordinate that are coordinate information of the touched position generated by the touch operation. The control circuit 81 detects a movement start point and a movement end point by a drag operation, based on the coordinate information output by the touch panel 9c, thereby specifying an amount and direction of movement of the figure A. Feed data and first to fourth coordinate data corresponding to apexes $P_0$ to $P_4$ of the figure A at a destination are obtained, so that cutting data is obtained.

Further, other figures B, C, D and E can be added by touch operation to the pattern list 102a and a composite figure V can be generated by editing the figures so that the figures A to E are combined together, as will be described in detail later (see FIGS. 11B and 11C). In this case, the control circuit 81 detects superposition of outlines of the figures adjacent to each other in the composite figure V and a point of intersection of the outlines of the adjacent figures, based on the coordinate data of the composite figure V. As a result, the control circuit 81 generates cutting data including the outline of the composite figure V serving as a full cut line and the detected superposed outlines and line segments between intersections of the outlines serving as half cut lines. The icon 103 is selected when the editing is completed.

The size and an angle of the figure are changeable on the editing screen 100 as well as movement of the figure. For example, when the size of the figure is changed, a distance obtained by swiping two points by a pinch operation, so that scaling is carried out. Further, an icon (not shown) to change an angle of figure A may be provided so that the setting of the figure A to be rotated is carried out by the touch operation to the icon. The touch panel 9c should not be limited to the resistance value detection type but may be of any type which can specify the touch position. Further, the touch operation and the drag operation may be carried out using a touch pen or the like. The outline of the figure A may be drawn using "straight line" of the pattern list 102a and a touch pen.

FIG. 12A shows a setting screen 104 on which the user optionally sets an operating condition. The setting screen 104 is provided with a cutter projection amount setting part 105a and a cutter pressure setting part 105b for the full cut mode and a cutter projection amount setting part 105c and a cutter pressure setting part 105d for the half cut mode. The setting screen 104 is further provided with direction keys 106a and 106b and an OK key 107. The cutter projection amount setting parts 105a and 105c and the cutter pressure setting parts 105b and 105d have respective plus sign keys and minus sign keys so that numerical values can be switched in each of the full and half cut modes independent of each other. The plus and minus sign keys are touched so that numerical values of a blade edge projection amount and the cutter pressure are changed. FIG. 12A shows the setting screen 104 for Kent paper (see FIG. 8). When the direction keys 106a and 106b are touched, the setting screen 104 for Kent paper is switched to a setting screen 104 for another material such as heavy paper. Further, when the OK key 107 is operated, the numerical values of a blade edge projection amount and the cutter pressure are set to the numerical values displayed on the setting screen 104.

Thus, the display 9a and the touch panel 9c serve as an input unit which inputs conditions for cutting the half and full cut lines. Further, the display 9a, the touch panel 9c and the control circuit 81 serve as a cutting condition changing unit for changing the cutter pressure and the projection amount of the blade edge 6a.

FIG. 12B shows an operation screen 108 during cutting in the half cut mode. The operation screen 108 displays a blade edge projection amount and a cutter pressure which are conditions for cutting a half cut line. Further, the operation screen 108 includes a preview image area 110 which displays, for example, a broken line as the half cut line based on cutting data of the edited pattern.

On the other hand, FIG. 12C shows an operation screen 109 during cutting in the full cut mode. The operation screen 109 displays a blade edge projection amount and a cutter pressure which are conditions for cutting a full cut line. Further, the preview image area 110 of the operation screen 109 displays a full cut line in a mode such that the full cut line is discriminable from a half cut line (a solid line, for example), The working of the cutting apparatus 1 will be described with reference to FIGS. 13 to 17. FIGS. 13 to 17 are flowcharts showing a processing program which is executed by the control circuit 81 and includes a cutting data generating program, and a cutting control program. A pattern to be edited is a developed view used to form a box 90 shown in FIG. 10, namely, a figure obtained by developing the box 90. The figure has a shape obtained by combining square figures A, B, C, D and E. The figure A corresponding to a bottom of one box 90 is congruent (has the same shape and the same sire as) to the other figures B to E corresponding to peripheral walls.

The user firstly causes the display 9a to display an editing screen 100 as shown in FIG. 11A when editing the developed view of the box 90. As a result, a pattern editing process starts (NO at step S1 in FIG. 13), so that a pattern can be selected from the pattern list 102a and edited on the editing screen 100. More specifically, when the user selects the square figure from the pattern list 102a by the touch operation, the selected figure A is displayed in a preview image area 101 (step S2).

The user then drags the figure A in the preview image area 101 to move the figure A to the position as shown in FIG. 11A (step S3). The control circuit 81 detects superposition and an intersection of outlines of the figure A and another figure, but the other figures have not been selected yet (NO at step S4). When the icon 103 on the editing screen 100 is touched (YES at step S1), the control circuit 81 stores cutting data of figure A at the position as the result of movement at step S3 on a storage unit such as the EEPROM 84, ending the processing. The cutting data is obtained by the control circuit 81 from feed data corresponding to apexes $P_0$ to $P_4$ of figure A in the destination and first to fourth coordinate data. Further, since the cutting data contains no superposition and no intersection of outlines of the figure A and another figure, the control circuit 61 affixes an attribute flag to the cutting data. The attribute flag indicates that line segments A1 to A4 or outlines are full cut lines.

The user then selects the same figure from the pattern list 102a to display the figure B on the editing screen 100 (step S2). The figure B is moved by the drag operation so as to be located over the figure A (step S3). As a result, the figures A and B are adjacent to each other and a line segment B3 of the figure B is superposed on the line segment A1 of the figure A, as shown in FIG. 11B. In this case, the control circuit 81 detects the superposition of the line segments A1 and B3 (YES at step S4) and carries out processing to put the superposed line segments A1 and B3 into a single line segment (step S5). As a result, the line segments A1 and B3 are represented as data of a single line segment, that is, coordinate data of a start point and an end point of a broken line in FIG. 11B.

The control circuit 81 further affixes an attribute flag to process the single line segment into a half out line (step S6). In this case, the control circuit 81 changes the line segments A1 and B3 to serve as a half cut line to, for example, a single broken line. As a result, a full-cut-line outline (a solid line, for example) of the composite figure and the half cut line are displayed in discriminable mode.

Further, the line segment A2 of the figure A and the line segment B2 of the figure B are adjacent to each other and have respective ends contacting each other. The line segment A4 of the figure A and the line segment B4 of the figure B are adjacent to each other and have respective ends contacting each other, and the ends have respective coordinates corresponding with each other. The control circuit 81 then carries out an extracting process to extract a contact part of the figures A and B based on coordinate data (line segment data) of the composite figure, thereby integrating the line segments A2 and B2 into a single line segment and the line segments A4 and B4 into a single line segment. The integrated line segments form a series of outline of the composite figure. The control circuit 81 then carries out a process of rearranging data thereby to change data in which line segments B1, B2, A2, A3, A4 and B4 as shown in FIG. 11B are cut in this sequence in a unicursal manner.

The pattern list 102a is also touched so that each one of the other figures C to E is added to the figure A. Thus, the figures A to E are arranged into a cross-shaped developed figure as shown in FIG. 11C, whereby the composite figure V formed by combining the figures A to E is edited as a pattern. In this case, the above-described steps S1 to S6 are also carried out for each one of the other figures C to F in the same manner as the figure B. Consequently, the line segments A2, A3 and A4 of the figure A and the line segments C4, D1 and E2 superposed on the line segments A2, A3 and A4 are integrated into signal line segments in the composite figure V, respectively (step S5). The control circuit 81 further affixes attribute flags to process each one of the single line segments into a half cut line and displays the half cut lines in the form of a broken line in the preview image area 101, for example (step S6).

The control circuit 81 thus generates cutting data used to cut the line segments serving as fold lines of the composite figure V in the half cut mode in the sequence of the line segments A1 (B3), A2 (C4), A3 (D1) and A4 (E2) as shown in FIG. 11C in the half cut mode in a unicursal manner. The control circuit 81 further carries out the extracting process and the rearranging process so that the outline of the composite figure V is out in the sequence of line segments B1, B2, C1, C2, C3, D2, D3, D4 E3, E4, E1 and B4 in a unicursal manner. Thus, the control circuit 81 generates cutting data used to execute the cutting operation in the order of the half cut lines and the full cut lines in turn. When the icon 103 on the editing screen 100 is touched (YES at step S1), the control circuit 81 stores the generated cutting data on the EEPROM 84, ending the editing process.

In starting the cutting, the user affixes the sheet S (Kent paper, for example) onto the holding member 10 as shown in FIG. 1 and sets the holding is ember 10 on the platen 3 of the cutting apparatus 1. The user further causes the display 9a to display the setting screen 104 as shown in FIG. 12A. As a result, a parameter setting process starts (see FIG. 14). The direction keys 106a and 106b are touched so that the display 9a is changed to the setting screen 104 for Kent paper (step S11), and conditions for the cutting operation are input.

More specifically, the setting screen 104 for the Kent paper displays previously set operating conditions (see FIG. 8). The user changes the "blade edge projection amount" in the full cut mode by touching the plus sign key and the minus sign key of the cutter projection amount setting part 105a (step S12). The user further changes the "cutter pressure" in the full cut mode by touching the plus sign key and the minus sign key of the cutter pressure setting part 105b (step S13). Regarding the half cut mode, too, the user touches the plus sign keys and the minus sign keys of the cutter projection amount setting part 105c and the cutter pressure setting part 105d thereby to change the "blade edge projection amount" and the "cutter pressure" in the same manner as described above (steps S14 and S15). When the OK key 107 is touched, the control circuit 81 stores new set values of the "blade edge projection amount" and the "cutter pressure" on the storage unit such as the EEPROM 84 (step S16). The control circuit 81 completes the parameter setting process, proceeding to a cutting process.

The control circuit 81 executes a cutting operation in the half cut mode (step S20) and a cutting operation in the full cut mode (step S30) in turn in the cutting process, based on the cutting data generated in the editing process, as shown in FIG. 15. More specifically, in the half cut mode as shown in FIG. 16, the control circuit 81 displays the operating screen 108 on the display 9a and further displays line segments B3, C4, D1 and E2 composing the half cut line, for example, in a broken line on the display 9a (step S21; and see FIG. 12B). The control circuit 81 further displays numerical values of the "blade edge projection amount" and the "cutter pressure" in the half cut mode, set at steps 514 and S15 on the operating screen 108 (step S22). In this case, the user confirms the numerical scale M of the cartridge 4 to adjust the projection amount of the blade edge 6a to the displayed value. The user further attaches the cartridge 4 to the cartridge holder 32 and switches the lever member 60 from the open position to the fixed position thereby to fix the cartridge 4 (see FIG. 4).

When determining that the cartridge 4 has been attached, based on a detection signal of the cartridge detection sensor 46 (YES at step S23), the control circuit 81 reads the set value of cutter pressure in the half cut mode from the storage unit (step S24). Upon receipt of the instruction, of cutting start by the operation switch of the operation device 9b, the control circuit 81 executes a cutting operation in the half cut mode (step S25).

In this case, the control circuit 81 moves the cutter 6 along line segments A1, A2, A3 and A4 sequentially in this order in a unicursal manner. The cutter pressure is set to a value suitable for the Kent paper serving as the sheet S in the half cut mode. Accordingly, the sheet S is prevented from displacement from the holding member 10, and the motors 15 and 25 are controlled to maintain synchronism. A groove with a depth suitable as a fold ox the developed figure is formed with the setting of the projection amount, of the blade edge 6a. After an outline of the square figure A has been formed on the sheet S using a high-precision half cut line, the control circuit 81 proceeds to a full cut process at step S30.

In the full cut process as shown in FIG. 17, the control circuit 81 causes the display 9a to display the operating screen 109 and displays the outline of the composite figure V composing the full cut line on the operating screen 109, for example, in a solid line, based on the cutting data (step S31; and see FIG. 12C). The control circuit 81 further displays on the operating screen 109 the numerical values of the blade edge projection amount and the cutter pressure in the full cut mode, set at steps S12 and S13 (step S32). At this time, the user releases the lever member 60 of the cartridge holder 32 from the fixed state thereby to detach the cartridge 4, adjusting the projection amount of the blade edge 6a to a displayed value with the numerical scale M of the cartridge 4 serving as a guide. Thereafter, the user re-attaches the cartridge 4 to the cartridge holder 32 and fixes the cartridge 4 by the lever member 60.

When determining that the cartridge 4 has been attached, based on the detection signal of the cartridge detection sensor 46 (YES at step S33), the control circuit 81 reads a set cutter pressure value in the full cut mode from the storage (step S34). Upon receipt of the instruction of cutting start by the operation switch of the operation device 9b, the control circuit 81 executes a cutting operation in the full cut mode (step S35). In this case, the control circuit 81 moves the cutter 6 along line segments B1, B2, C1, C2, C3, D2, D3, D4, E3, E4, E1 and B4 sequentially in this order in a unicursal manner. Since the cutter pressure and the projection amount of the blade edge 6a are set to respective values suitable for the bent paper serving as the sheet S in the full cut mode, a high-precision cutting is carried out as in the half cut mode. When, the composite figure V has been cut out of the sheet S, a sequence of processes for the cutting operation is completed.

The user tears the composite figure V from the holding member 10 upon completion of the above-described processing. Four sides are folded, at a 90-degree angle with four half cut lines serving as fold lines, with the result that a box 90 as shown in FIG. 10 can be formed.

Each one of the RAM 83 and the EEPROM 84 serves as a storage unit in the above-described cutting apparatus 1. The control circuit 81, the display 9a, the touch panel 9c, the operation device 9b and the like serve as an editing unit. The storage unit and the editing unit configure a cutting data generator 91. Further, the control circuit 81 executing step S4 serves as a detection unit, and the control circuit 81 executing steps S1 to S6 serves as a cutting data generating unit.

The cutting apparatus 1 of the embodiment includes the editing unit which edits a plurality of figures composing a pattern, the detection unit which detects superposition of outlines of the figures adjacent to each other and/or an intersection of the outlines of the adjacent figures in the edited pattern, the cutting data generating unit which generates Cutting data including a full cut line which is an outline of the pattern and a half cut line which is the detected superposed outline and/or a line segment between the intersections.

According to the above-described configuration, the pattern is composed of a plurality of figures, which are edited by the editing unit. The detection unit detects superposition of outlines of the figures adjacent to each other and/or an intersection of the outlines of the adjacent figures in the edited pattern. Cutting data is automatically generated which includes a full cut line which is an outline of the pattern and a half cut line which is the detected superposed outline and/or a line segment between the intersections. This can eliminate a troublesome work such as confirmation and designation of a type of cut line, with the result that the cutting data can be easily generated.

The cutting apparatus 1 further includes the display unit which displays the pattern edited by the editing unit and a display control unit (the control circuit 81) which causes the display unit to display the cut lines in a mode such that the cut lines are discriminable from each other, based on the generated cutting data. According to this configuration, the full cut line and the hair out line formed on the sheet S can be visually grasped.

The cutting apparatus 1 further includes the storage unit which stores a condition for an operation for cutting the full cut line and a condition for an operation for cutting the half cut line, for every one of the types of the sheets. According to this configuration, when the condition for every one of the types of the sheets S is stored, the cutting can be executed under the condition suitable for the type of the sheet S without setting the condition for cutting operation again.

The cutting apparatus 1 further includes the input unit which inputs the condition for the cutting of the full cut line and the condition for the cutting of the half cut line. According to this configuration, the conditions for the cutting of the full cut line and the half cut line can be set for every type of sheet S independent of each other, with the result that the cutting suitable for the actual type of sheet S can be carried out.

The cutting unit has the cutting blade (the cutter 6) capable of being pressed against the sheet S. The cutting apparatus further includes the cutting condition change unit which changes at least a pressure the cutting blade applies to the sheet S during pressing, in the conditions. According to this configuration, desired cutting conditions inclusive of changing the cutting blade pressure to a value suitable for every one of types of sheets S can be set.

FIGS. 18A and 18B illustrate a second embodiment. Only the difference between the first and second embodiments will be described. In the second embodiment, identical or similar parts are labeled by the same reference symbols as those in the first embodiment.

The composite figure V can be edited by combining various figures or line segments, instead of the combination of the figures A to E. For example, the figures A and B are selected from the pattern list 102a on the editing screen 100 by the touch operation at step S2. For example, a vertical dimension of the figure A is increased into a figure Av and a horizontal dimension of the figure B is increased into a figure Bv at step S3, as shown in FIG. 18A. The composite figure V is generated, by moving the figures Av and Bv into a cross-shaped developed figure (see FIG. 18B).

In this case, the control circuit 81 detects intersections $P_0$ ($P_4$), $P_1$, $P_2$ and $P_3$ between an outline of the figure Av and an outline of the figure Bv (YES at step S4). Further, the control circuit 81 affixes an attribute flag of half cut line to each one of a line segment A1 between the intersections $P_0$ and $P_1$, a line segment A2 between the intersections $P_1$ and $P_2$, a line segment A3 between the intersections $P_2$ and $P_3$ and a line segment A4 between the intersections $P_3$ and $P_4$ (step S6). As a result, the line segments A1 to A4 serving as half cut lines are displayed, for example, as broken lines on the preview image area 101. In this case, since no line segments are superposed between the figures Av and Bv, step S5 is not carried out. The second embodiment works in the same manner as the first embodiment and can achieve the same advantageous effects as the first embodiment as the result of execution of the above-described editing process.

Further, FIG. 19 exemplifies a composite figure W formed by combining a rectangle figure Aw and a circle figure Bw. Further, the control circuit 81 affixes an attribute flag of half cut line to a straight line w1 between the intersections $P_0$ and $P_1$ (step S6). As a result, the line segment w1 serving as a half cut line is displayed, for example, as broken line on the preview image area 101, and cutting data for the composite figure W can foe generated in the editing process.

FIG. 20 illustrates a third embodiment. Only the difference between the first and third embodiments will be described. A personal computer (referred to as "PC 120") shown in FIG. 20 is configured as a cutting data generator which generates the above-described cutting data. More specifically, the PC 120 includes a control circuit 121 mainly comprised of a computer (a CPU). A ROM 122, a RAM 123 and an EE PROM 124 each of which serves as a storage unit are connected to the control circuit 121. An input section 125 is also connected to the control circuit 121. The input section 125 includes a keyboard and a mouse both of which are operated for the user to enter various instructions, make a selection and input and a display section (a display unit such as LCD) 126 performing display of necessary messages or the like to the user. The PC 120, the display 126, the keyboard and the mouse serve as an editing unit. For example, when the mouse is operated, the PC 120 selects a figure by a mouse cursor on the LCD or obtains position coordinates of the mouse cursor designated, for movement, of the figure as a disposition position corresponding to the X-Y coordinate system of the cutting apparatus 1.

The PC 120 includes communication section 127 which performs wired or wireless communication with the cutting apparatus 1. The communication section 127 is connected to a communication section 128 of the ousting apparatus 1 via a cable 127a, for example. As a result, data including the cutting data can be transmitted and received between the PC 120 and the cutting apparatus 1. The control circuit 121 controls the entire PC 120 and executes a cutting data generating program and the like. The ROM. 122 stores the cutting data generating program and the like. The EEPROM 124 stores various cutting data, an operating condition table and the like. The RAM 123 temporarily stores data and programs necessary for various processes as well as the cutting data.

The control circuit 121 is configured to execute processing of the cutting data generating program, namely, steps S1 to S6 in FIG. 13. As a result, the control circuit 121 automatically sets the full out line and the half out line to generate the cutting data.

The control circuit 121 is configured as the editing unit, the detection unit, the cutting data generating unit and the display control unit in the same manner as the control circuit S1 in she first embodiment. Accordingly, cutting data of the full and half cut lines of the pattern edited by the editing unit can be generated on the PC 120, with the result that the PC 120 achieves the same advantageous effects as the cutting data generator 91 in the first embodiment.

The foregoing embodiments should not be restrictive but may be modified or expanded as follows. The foregoing configuration is applicable to various types of apparatuses and machines each of which is provided with a cutting unit.

The control circuit 81 may be configured to execute a cutting operation in which a half out line is formed into the shape of perforation. In order that the half cut line may be formed into the perforation shape, the control circuit 81 controls the cutter 6 so that the cotter 6 is moved intermittently up and down during the cutting operation. In this case, in the parameter setting process, the projection amount of the blade edge 6a in the half cut mode is set to the same value as the projection amount of the blade edge 6a in the full cut mode. As a result, after execution of the cutting operation to form the perforation-shaped half cut line, the cutting operation to form the full cut line is executable without change in the projection amount of the blade edge 6a.

The figure or the composite figure should not be limited to that exemplified above but may be a figure including a polygonal figure or curved lines. For example, cutting data of a figure including curved lines, such as a circle figure Bw is provided as curvilinear coordinate data by known as Bezier curve algorithm. More specifically, the coordinate data of the cutting data is calculated (corrected) based on an offset d (see FIG. 6) of the cutter 6 so that the offset d does not result in displacement of the cutting line and is accordingly provided as a control point to cause the outline of the figure to correspond with an actual cutting line. Thus, in the composite figure Aw in FIG. 19, an intersection between the outlines of the figures Aw and Bw can be detected at step S4 based, on the curvilinear coordinate data of the figure Bw and the coordinate ata of the figure Aw as the control point.

The cutting data generation program stored in the storage unit in each of the cutting apparatus 1 and the PC 120 may be stored on a computer-readable storage medium including a USB memory, a CD-ROM, a flexible disc, a DVD and a flash memory. In this case, the program stored on the storage medium is read and executed by computers of various data processors with the result that this modified form, works in the same manner as the above-described embodiments and can achieve the same advantageous effects as the above-described embodiments.

The foregoing description and drawings are merely illustrative of the present disclosure and are not to be construed in a limiting sense. Various changes and modifications will become apparent to those of ordinary skill in the art. All such changes and modifications are seen to rail within the scope of the appended claims.

We claim:

1. A cutting apparatus which cuts a desirable pattern out of a sheet, comprising:
   a moving unit configured to move a sheet and a cutting unit relative to each other;
   an editing unit configured to edit a plurality of figures into a desirable pattern; and
   a control device configured to:
      generate a composite figure by combining a plurality of figures by editing by the editing unit;
      determine whether an outline of one of the plurality of figures constituting the generated composite figure and an outline of another of the figures constituting the generated composite figure are superposed; and
      in case it is determined that the outline of the one figure and the outline of the another figure are superposed, generate cutting data including a first cut line which is an outline of the generated composite figure and a second cut line which is a superposed portion of the outline of the one figure and the outline of the another figure determined as being superposed, the first cut line being a line along which the pattern as represented by the composite figure is cut out of a sheet, the second cut line being a groove-shaped or perforated line formed on the pattern as represented by the composite figure; and
   control the moving unit so that the first and second cut lines are formed on the sheet, based on the cutting data.

2. The apparatus according to claim 1, further comprising a display unit configured to display the pattern as represented by the composite figure generated by editing by the editing unit, wherein the control device is further configured to cause the display unit to display the first and second cut lines of the pattern as represented by the composite figure in a mode such that the first and second cut lines are discriminable from each other, based on the generated cutting data.

3. The apparatus according to claim 2, further comprising a storage unit configured to store a first condition for an operation for cutting the first cut line and a second condition for an operation for cutting the second cut line, for every one of a plurality of types of the sheets.

4. The apparatus according to claim 3, further comprising an input unit configured to input the first and second conditions corresponding to the type of the sheet.

5. The apparatus according to claim 4, wherein the cutting unit has a cutting blade capable of being pressed against the sheet, the apparatus further comprising a cutting condition change unit configured to change at least a pressure the cutting blade applies to the sheet during pressing, in the conditions.

6. The apparatus according to claim 1, further comprising a storage unit configured to store a first condition for an operation for cutting the first cut line and a second condition for an operation for cutting the second cut line, for every one of a plurality of types of the sheets.

7. The apparatus according to claim 6, further comprising an input unit configured to input the first and second conditions corresponding to the type of the sheet.

8. The apparatus according to claim 7, wherein the cutting unit has a cutting blade capable of being pressed against the sheet, the apparatus further comprising a cutting condition change unit configured to change at least a pressure the cutting blade applies to the sheet during pressing, in the conditions.

9. The cutting apparatus according to claim 1, wherein the control device is further configured to:
   determine whether there are a plurality of intersections between the outline of the one figure and the outline of the another figure; and
   in case it is determined that there are a plurality of intersections between the outline of the one figure and the outline of the another figure, generate cutting data including the first cut line which is an outline of the generated composite figure and the second cut line which is a line segment connecting two intersections of the plurality of intersections.

10. The cutting apparatus according to claim 1, wherein the control device is further configure to:
   generate cutting data for executing a cutting operation for forming the second cut line on the sheet and then executing a cutting operation for forming the first cut line on the sheet.

* * * * *